United States Patent
Budler

(10) Patent No.: US 10,465,499 B2
(45) Date of Patent: Nov. 5, 2019

(54) UNDERGROUND GPS FOR USE IN PLUG TRACKING

(71) Applicant: Halliburton Energy Services, Inc., Houston, TX (US)

(72) Inventor: Nicholas Frederick Budler, Claremore, OK (US)

(73) Assignee: Halliburton Energy Services, Inc., Houston, TX (US)

(*) Notice: Subject to any disclaimer, the term of this patent is extended or adjusted under 35 U.S.C. 154(b) by 108 days.

(21) Appl. No.: 15/548,689

(22) PCT Filed: Mar. 31, 2015

(86) PCT No.: PCT/US2015/023689
§ 371 (c)(1),
(2) Date: Aug. 3, 2017

(87) PCT Pub. No.: WO2016/159992
PCT Pub. Date: Oct. 6, 2016

(65) Prior Publication Data
US 2018/0030828 A1 Feb. 1, 2018

(51) Int. Cl.
*E21B 47/09* (2012.01)
*E21B 33/16* (2006.01)
(Continued)

(52) U.S. Cl.
CPC .............. *E21B 47/09* (2013.01); *E21B 33/16* (2013.01); *E21B 47/122* (2013.01); *E21B 47/14* (2013.01); *G01S 19/13* (2013.01)

(58) Field of Classification Search
CPC ...... E21B 47/09; E21B 47/091; E21B 47/122; E21B 33/08; E21B 33/13
See application file for complete search history.

(56) References Cited

U.S. PATENT DOCUMENTS 2,492,794 A * 12/1949 Goble ................... E21B 7/061
175/41
4,297,699 A    10/1981 Fowler et al.
(Continued)

OTHER PUBLICATIONS

International Search Report and The Written Opinion of the International Search Authority, or the Declaration, dated Dec. 10, 2015, PCT/US2015/023689, 17 pages, ISA/KR.

*Primary Examiner* — Jennifer H Gay
(74) *Attorney, Agent, or Firm* — Haynes and Boone, LLP

(57) ABSTRACT

A system for tracking an object in oil and gas wellbore operations wherein a releasable object carrying a first signal system is released into tube system associated with a wellbore. The first signal system communicates with one or more second signal systems positioned along the travel path of the object; along the surface of the formation; and/or throughout the wellbore. First signal system and the second signal system may communicate by RF signals. First signal system and any second signal systems positioned on the surface communicate by through-the-earth or very low frequency signals. A global positioning system may be utilized in conjunction with any second signal systems on the surface to identify the absolute location of the object in the underground wellbore. The first signal system carried by the object may be a piezoelectric system disposed to transmit a signal when the object experiences a predetermined pressure.

20 Claims, 8 Drawing Sheets

(51) Int. Cl.
*E21B 47/12* (2012.01)
*E21B 47/14* (2006.01)
*G01S 19/13* (2010.01)

(56) References Cited

U.S. PATENT DOCUMENTS

| | | | | |
|---|---|---|---|---|
| 5,363,094 A * | 11/1994 | Staron | ............... | E21B 47/123 |
| | | | | 166/254.2 |
| 6,161,630 A | 12/2000 | Stump et al. | | |
| 6,585,042 B2 * | 7/2003 | Summers | ............... | E21B 33/16 |
| | | | | 166/177.4 |
| 6,597,175 B1 * | 7/2003 | Brisco | ............... | E21B 33/05 |
| | | | | 324/326 |
| 6,634,425 B2 * | 10/2003 | King | ............... | E21B 33/16 |
| | | | | 166/253.1 |
| 6,789,619 B2 * | 9/2004 | Carlson | ............... | E21B 33/05 |
| | | | | 166/177.4 |
| 8,162,055 B2 * | 4/2012 | Lewis | ............... | C04B 28/02 |
| | | | | 166/177.4 |
| 8,584,519 B2 * | 11/2013 | Maida | ............... | E21B 47/16 |
| | | | | 73/152.54 |
| 8,680,866 B2 * | 3/2014 | Marsala | ............... | G01V 3/30 |
| | | | | 324/334 |
| 8,973,656 B2 * | 3/2015 | McClung, III | ............... | B82Y 15/00 |
| | | | | 166/250.12 |
| 9,249,646 B2 * | 2/2016 | Hannegan | ............... | E21B 47/0005 |
| 9,347,309 B2 * | 5/2016 | Raducanu | ............... | E21B 47/09 |
| 9,500,069 B2 * | 11/2016 | Ersoz | ............... | E21B 43/26 |
| 9,611,736 B2 * | 4/2017 | Marsala | ............... | E21B 49/00 |
| 9,631,470 B2 * | 4/2017 | Orban | ............... | E21B 43/263 |
| 9,911,016 B2 * | 3/2018 | Ownby | ............... | G06K 7/10316 |
| 10,198,606 B2 * | 2/2019 | Ownby | ............... | G06K 7/10316 |
| 2002/0157828 A1 * | 10/2002 | King | ............... | E21B 33/16 |
| | | | | 166/285 |
| 2003/0062155 A1 * | 4/2003 | Summers | ............... | E21B 33/16 |
| | | | | 166/66 |
| 2005/0194132 A1 * | 9/2005 | Dudley | ............... | E21B 47/00 |
| | | | | 166/254.1 |
| 2005/0269083 A1 * | 12/2005 | Burns, II | ............... | E21B 23/00 |
| | | | | 166/255.2 |
| 2006/0041795 A1 * | 2/2006 | Gabelmann | ............... | G01V 3/34 |
| | | | | 714/699 |
| 2009/0219171 A1 | 9/2009 | Vigneaux | | |
| 2010/0051275 A1 * | 3/2010 | Lewis | ............... | C04B 28/02 |
| | | | | 166/286 |
| 2010/0212962 A1 * | 8/2010 | Rosten | ............... | E21B 7/15 |
| | | | | 175/40 |
| 2010/0268470 A1 * | 10/2010 | Kamal | ............... | G01V 11/00 |
| | | | | 977/953 |
| 2012/0085538 A1 * | 4/2012 | Guerrero | ............... | E21B 33/12 |
| | | | | 166/284 |
| 2012/0132418 A1 * | 5/2012 | McClung, III | ............... | B82Y 15/00 |
| | | | | 166/250.12 |
| 2012/0268135 A1 * | 10/2012 | Marsala | ............... | G01V 3/30 |
| | | | | 324/338 |
| 2013/0118752 A1 * | 5/2013 | Hannegan | ............... | E21B 47/0005 |
| | | | | 166/336 |
| 2014/0076542 A1 * | 3/2014 | Whitsitt | ............... | E21B 34/14 |
| | | | | 166/250.1 |
| 2014/0195188 A1 * | 7/2014 | Donderici | ............... | G01V 1/48 |
| | | | | 702/103 |
| 2014/0251603 A1 * | 9/2014 | Raducanu | ............... | E21B 47/09 |
| | | | | 166/255.1 |
| 2014/0260732 A1 | 9/2014 | Wood et al. | | |
| 2014/0265304 A1 * | 9/2014 | MacDonald | ............... | E21B 47/122 |
| | | | | 285/47 |
| 2014/0338905 A1 * | 11/2014 | Ersoz | ............... | E21B 47/00 |
| | | | | 166/280.1 |
| 2015/0075770 A1 * | 3/2015 | Fripp | ............... | E21B 43/1185 |
| | | | | 166/65.1 |
| 2015/0246711 A1 * | 9/2015 | Lee | ............... | B63B 21/50 |
| | | | | 405/224 |
| 2015/0268371 A1 * | 9/2015 | Donderici | ............... | E21B 47/02216 |
| | | | | 324/346 |
| 2015/0275649 A1 * | 10/2015 | Orban | ............... | E21B 43/263 |
| | | | | 73/152.54 |
| 2015/0300894 A1 * | 10/2015 | Robutel | ............... | G01N 29/036 |
| | | | | 310/323.21 |
| 2015/0320357 A1 * | 11/2015 | Kuraguntla | ............... | G01F 1/00 |
| | | | | 600/505 |
| 2015/0361761 A1 * | 12/2015 | Lafferty | ............... | E21B 23/14 |
| | | | | 166/250.01 |
| 2016/0084075 A1 * | 3/2016 | Ingraham | ............... | E21B 23/10 |
| | | | | 166/255.1 |
| 2016/0335464 A1 * | 11/2016 | Ownby | ............... | G06K 7/10316 |
| 2017/0009566 A1 * | 1/2017 | Fan | ............... | E21B 43/305 |
| 2017/0096891 A1 * | 4/2017 | Gao | ............... | E21B 33/16 |
| 2017/0122096 A1 * | 5/2017 | Durtler | ............... | E21B 47/0905 |
| 2017/0248009 A1 * | 8/2017 | Fripp | ............... | E21B 34/066 |
| 2017/0306754 A1 * | 10/2017 | Golparian | ............... | E21B 47/123 |
| 2017/0314372 A1 * | 11/2017 | Tolman | ............... | E21B 33/134 |
| 2017/0335644 A1 * | 11/2017 | Ciezobka | ............... | E21B 23/10 |
| 2018/0010442 A1 * | 1/2018 | Coss | ............... | E21B 33/16 |
| 2018/0016891 A1 * | 1/2018 | Rogozinski | ............... | E21B 33/16 |
| 2018/0016892 A1 * | 1/2018 | Budler | ............... | E21B 47/091 |
| 2018/0030828 A1 * | 2/2018 | Budler | ............... | E21B 33/16 |
| 2018/0150660 A1 * | 5/2018 | Ownby | ............... | G06K 7/10316 |
| 2018/0225485 A1 * | 8/2018 | Ownby | ............... | G06K 19/0708 |

* cited by examiner

UNDERGROUND GPS FOR USE IN PLUG TRACKING

PRIORITY

The present application is a U.S. National Stage patent application of International Patent Application No. PCT/US2015/023689, filed on Mar. 31, 2015, the benefit of which is claimed and the disclosure of which is incorporated herein by reference in its entirety.

BACKGROUND OF THE INVENTION

Field of the Invention

This invention relates to methods of tracking the release and movement of one or more plugs, balls, darts or similar devices in a pipe or tube system of an oil or gas well. Such systems may include drill, completion or production strings disposed in wellbores, whether cased or uncased, whether single or multi-lateral in nature (any such system is referred to in this specification and the claims simply as "tube system").

Description of the Prior Art

It is well known in the art to use plugs, balls, darts or similar devices released into an oil and gase tube system to accomplish one or more tasks (any such plugs, balls, darts or similar device is referred to in this specification and the claims simply as a "ball"). Such tasks may include separating a displacement fluid from another fluid in a dowhole operation or downhole tool actuation.

A fluid of a particular type, composition, viscosity and/or other physical properties is frequently displaced through a pipe by a second fluid of a different type, composition, viscosity or other property. Very often, it is necessary to displace a first fluid through a pipe by a second fluid without mixing the two fluids. This has heretofore been accomplished by physically inserting a resilient plug or ball between the two fluids. The plug functions to separate the fluids, preventing them from being mixed and also to wipe the walls of the pipe and remove residue therefrom as the first fluid is displaced through the pipe by the second fluid. For example, in cementing operations, a displacement fluid is used to push cement slurry through the tube system. Specifically, well pipe used to case wellbores is cemented into the wellbore to anchor the well pipe and isolate differently pressured zones penetrated by the wellbore. Pipe used for this purpose is generally referred to as "casing." The cementing step is initiated by pumping a cement slurry down into the casing from the well surface. The cement slurry flows out from the bottom of the casing and returns upwardly toward the surface in the annulus formed between the casing and the surrounding wellbore.

In the cementing process, the fluid normally used in the drilling of the wellbore, referred to herein generally as "drilling fluid," is displaced from the casing ahead of the cement slurry pumped into the casing. When a sufficient volume of the cement slurry has been pumped into the well pipe, drilling fluid is used to displace the cement from the well pipe to prevent the pipe from being obstructed by the cured cement.

The drilling fluid and cement slurry are separated during the displacements with appropriate liquid spacers, or more preferably, with resilient, sliding wiper plugs or balls that seal along the inside of the well pipe and isolate the cement slurry from the drilling fluid. When using wiper plugs to separate the drilling fluid and cement slurry, the cement slurry is pumped behind a first wiper plug to push the plug through the casing, forcing the drilling fluid in the casing to flow ahead of the plug. As the plug moves along the pipe, it wipes the inner surface of the pipe to remove debris that could mix with the slurry. The drilling fluid displaced from the bottom of the casing flows upwardly through the annulus and returns toward the well surface.

When a sufficient volume of cement has been pumped behind the first wiper plug, a second wiper plug is positioned in the casing and drilling fluid is pumped into the casing behind the second plug to push the cement slurry through the casing. A flow passage in the first plug opens when it reaches the casing bottom to permit the cement slurry to flow through and past the plug, out the casing bottom. Once the first wiper seal has been opened and its seal terminated, the continued advance of the second plug through the casing displaces the cement slurry past the first plug, around the end of the casing, and up into the annulus. The second plug stops and maintains its sealing engagement with the casing once it arrives at the bottom of the casing.

In other operations, a dowhole tool or mechanism may be designed to be actuated by the application of a predetermined fluid pressure applied to the tool. In order to accomplish this, a plug, ball, dart or similar device is pumped down the tube system and used to temporarily increase the fluid pressure within the tube system at a desired location with the increase ein pressure utilized to actuate a dowhole tool or mechanism. For example, during the stimulation of subterranean wells, a production sliding sleeve having ports is introduced into the well bore for fracturing, acidizing, or other treatment applications. A number of sleeves may be run on a single production string. The sleeve(s) may be operated by either a mechanical or hydraulic shifting tool run on coiled tubing or on jointed tubing using a ball-drop system. In the ball-drop system, a ball is dropped into the well bore and then fluid pumped into a portion of the sleeve at a sufficient pressure such that the ball lands on a baffle or seat, causing a pressure increase in the fluid. As the fluid pressure increases, the pressure causes the sleeve to open. Once the sleeve is opened, the ports of the sleeve align with ports in the production string and fluid flow is diverted through the ports.

In any of the ball drop operations described above, it is important to know where the ball is in the tube system. In the case of cementing operations, the balls are generally placed into the well at the surface using ball injector apparatus or released from a plug container. Ensuring the positive release of the cementing plug from the plug container is critical to the cementing operation since the release is used by the operator to measure the volume of cement being pumped downhole.

Typical prior art cementing plug containers utilize a mechanical lever actuated type plug release indicator linked to an external flipper to indicate the passage of the cementing plug from the cementing plug containers. In some instances, these prior art mechanical lever actuated type plug release indicators may indicate the passage of the cementing plug from the cementing plug container, although the cementing plug is still contained within the container. The failure to properly release the cementing plug from the cementing plug container can ruin an otherwise profitable well cementing job due to the over-displacement of the cement to insure an adequate amount of cement has been pumped into the annulus between the casing and wellbore. Likewise, the mechanical lever or flipper paddle on the inner diameter of the plug container can often damage the plug as it passes through. In addition, smaller balls or objects will not always activate the flipper.

Another type of cementing plug indicator utilizes a radioactive nail placed into the cementing plug in the cementing plug container. When the cementing plug having the radioactive nail lodged therein is no longer present in the cementing plug container, a radiation measuring instrument, such as a Geiger counter, will not react to the radiation emitted from the radioactive nail in the cementing plug thereby indicating that the plug is no longer in the cementing plug container. However, since the shelf life of readily available and easily handled radioactive nails is limited, such nails may be difficult to obtain and store, when working in remote areas.

Additionally, an acoustic type plug release indicator can be utilized in which a microphone detects the sound of the plug moving through the well casing and transmits the signal to an operator listening system and a magnetic tape recorder Once a ball is released into a tube system, existing downhole objects such as plugs, balls and darts have no way of communicating their location to the surface except through pressure spikes that result when the object encounters a restriction. To the extent the object passes through the restriction, pressure may spike and then diminish once the object has passed through the restriction. To the extent the object becomes lodged in a restriction, pressure will spike and remain elevated. Likewise, to the extent the object lands on the desired seat, pressure will spike and remain elevated. However, there is no way for the surface operator to know if any particular pressure spike is from an object that has landed as desired or from an object that may have become lodged or stuck in the tube system above the desired seat. In other words, to assess the movement of an object through the tube system, an operator can attempt to interpret changes in pressure. Moreover, while such a method may indicate when an object has landed on a seat, the method provides very little feedback with respect to the movement of the object through the tube system.

Thus, there is a need for a system and method for more accurately tracking the release and movement of a ball, plug, dart or similar object moving through a wellbore system.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION OF THE INVENTION

Figure 1:
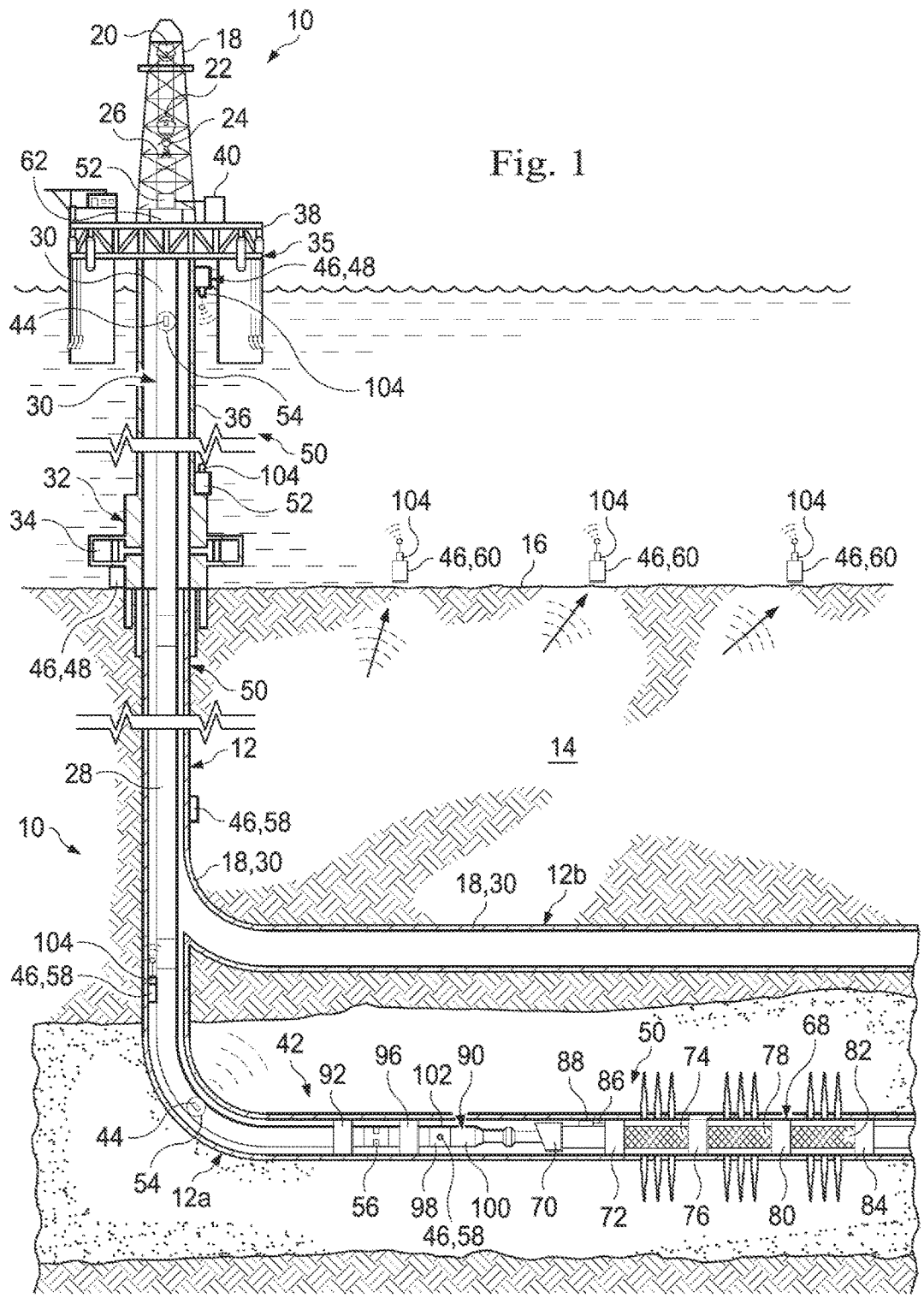
FIG. 1 is a plan view of a marine based production system having a releasable object tracking system of the disclosure.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the apparatus according to the present disclosure is equally well suited for use in onshore operations and vice-versa. Further, unless otherwise noted, even though a Figure may depict a cased hole, it should be understood by those skilled in the art that the apparatus according to the present disclosure is equally well suited for use in open hole operations.

Generally, in one or more embodiments, a method and system for tracking objects released into a tube system of a wellbore is provided wherein the object carries a first signal system, which may be either a signal transmitter, a signal receiver, or both. Deployed at one or more locations throughout or in proximity to the wellbore tube system is one or more second signal systems, which may be either signal receivers, signal transmitters or both, in order to communicate with the first signal system. In one or more embodiments, one signal system is an RFID chip and the other signal system is an RFID reader. In one or more embodiments, the releasable object carries a signal transmitter comprising an RFID chip. In this case, the second signal system comprises an RFID reader which may be positioned along the tube system, such as adjacent an object release, and identifies the object as it passes the RFID reader. Likewise, the one or more second signal systems, such as RFID readers, may be positioned along the tube system of the wellbore and disposed to identify when the releasable object passes a particular location. In one or more embodiments, the signal transmitter(s) may each be a magnet and the signal receiver(s) may each be an electromagnetic sensor. For example, a magnet may be attached to or carried by the releasable object and electromagnetic sensors may be positioned along the wellbore. In one or more embodiments, one signal system is simply an electromagnetic (EM) transmitter that communicates with a network of at least two and preferably three or more of a second signal system comprised of electromagnetic receivers positioned adjacent the surface and each having global positioning system (GPS) verified locations. As the releasable object moves through the wellbore, the surface receivers receive an EM signal and determine the location of the ball in the wellbore. In one or more embodiments, the signal transmitter is an EM transmitter emitting EM signals in the very-low frequency (VLF) range (approximately 3-30 kilohertz (kHz). A VLF receiver is positioned at the surface as a second signal system and the signal transmitter transmits a VLF signal to the surface at predetermined time intervals. In one or more embodiments, the first signal system carried by the releasable object includes a piezoelectric system which emits a signal based on pressure applied to a piezoelectric element of the piezoelectric system.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Wellbore 12 may be formed of a single or multiple bores 12a, 12b . . . 12n, extending into the formation 14. Wellbore 12 may include one or more casing strings 18 cemented therein, such as the surface, intermediate and production casing shown in FIG. 1.

Drilling and production system 10 includes a drilling rig 20. Drilling rig 20 may include a hoisting apparatus 22, a travel block 24, and a swivel 26 for raising and lowering casing, drill pipe, production tubing or other types of pipe or tubing strings 30.

Drilling rig 20 may be located proximate to or spaced apart from a well head 32, such as in the case of an offshore arrangement as shown. One or more pressure control devices 34, such as blowout preventers and other equipment associated with drilling or producing a wellbore may also be provided at wellhead 32.

For offshore operations, whether drilling or production, drilling rig 20 may be mounted on an oil or gas platform 35, such as illustrated in the offshore platform shown in FIG. 1. Although system 10 is illustrated as being a marine-based system, system 10 may be deployed on land. In any event, for marine-based systems, a subsea conduit 36 extends from deck 38 of platform 34 to a subsea wellhead 32. Tubing string 30 extends down from drilling rig 20, through subsea conduit 36 and into wellbore 12.

A working or service fluid source 40 may supply a working fluid pumped to the upper end of tubing string 30 and flow through tubing string 30. Working fluid source 40 may supply any fluid utilized in wellbore operations, including without limitation, drilling fluid, cementious slurry, acidizing fluid, liquid water, steam or some other type of fluid.

Wellbore 12 may include subsurface equipment 42 disposed therein, such as, for example, a completion assembly or some other type of wellbore tool.

Wellbore drilling and production system 10 may generally be characterized as having a pipe system 50. For purposes of this disclosure, pipe system 50 may include casing, risers, tubing, drill strings, completion or production strings, subs, heads or any other pipes, tubes or equipment that attaches to the foregoing, such as string 30 and conduit 36, as well as the wellbore and laterals in which the pipes, casing and strings may be deployed.

In one or more embodiments, an object release 52 may be deployed along the pipe system 50 for release of a releasable object 54 into the pipe system 50. For purposes of the disclosure, the term "releasable object" or "object" is used to refer to plugs, balls, darts or similar objects that may be released into a tubing string or wellbore. The object 54 is generally characterized as formed of a body with no surface 16 or drilling rig 20 attached guiding mechanisms (such as a wireline or tubing) for guiding or urging the body down wellbore 12. Except for specific embodiments which are described below, the body of object 54 is not limited to any particular shape. While object release 52 may be deployed adjacent drilling rig 20, in other embodiments, object release 52 may be deployed at any other location of drilling and production system 10, such as along a riser or conduit 36 or at a wellhead 32 or blowout preventer 34.

Object 54 carries a first signal system 44 disposed to communicate with one or more second signal systems 46 deployed in association with drilling and production system 10 as described in more detail below. In this regard, at a location above the wellhead 32, one or more second signal systems 46 may be deployed along pipe system 50 as above-the-wellhead second signal system 48. Alternatively, or in addition thereto, one or more second signal systems 46 may be deployed in wellbore 12 along pipe system 50 as wellbore second signal system 58. Alternatively, or in addition thereto, one or more second signal systems 46 may be deployed at or in proximity to surface 16 as surface second signal systems 60. Second signal systems 48, 58 and/or 60 may be signal receivers or signal readers in some embodiments. Alternatively, second signal systems 48, 58 and/or 60 may be signal transmitters in some embodiments.

In any event, one or more ball seats or landing collars 56 may be deployed along the pipe system 50 for receipt of an object 54 during a particular wellbore operation.

FIG. 1 also illustrates surface mounted equipment 62 of a drilling or production system 10. Persons of ordinary skill in the art will appreciate that the disclosure is not limited to a particular type of surface mounted equipment, but generally refers to any type of equipment mounted above the wellhead 32. Such surface mounted equipment may be an object release 52.

Figure 2:
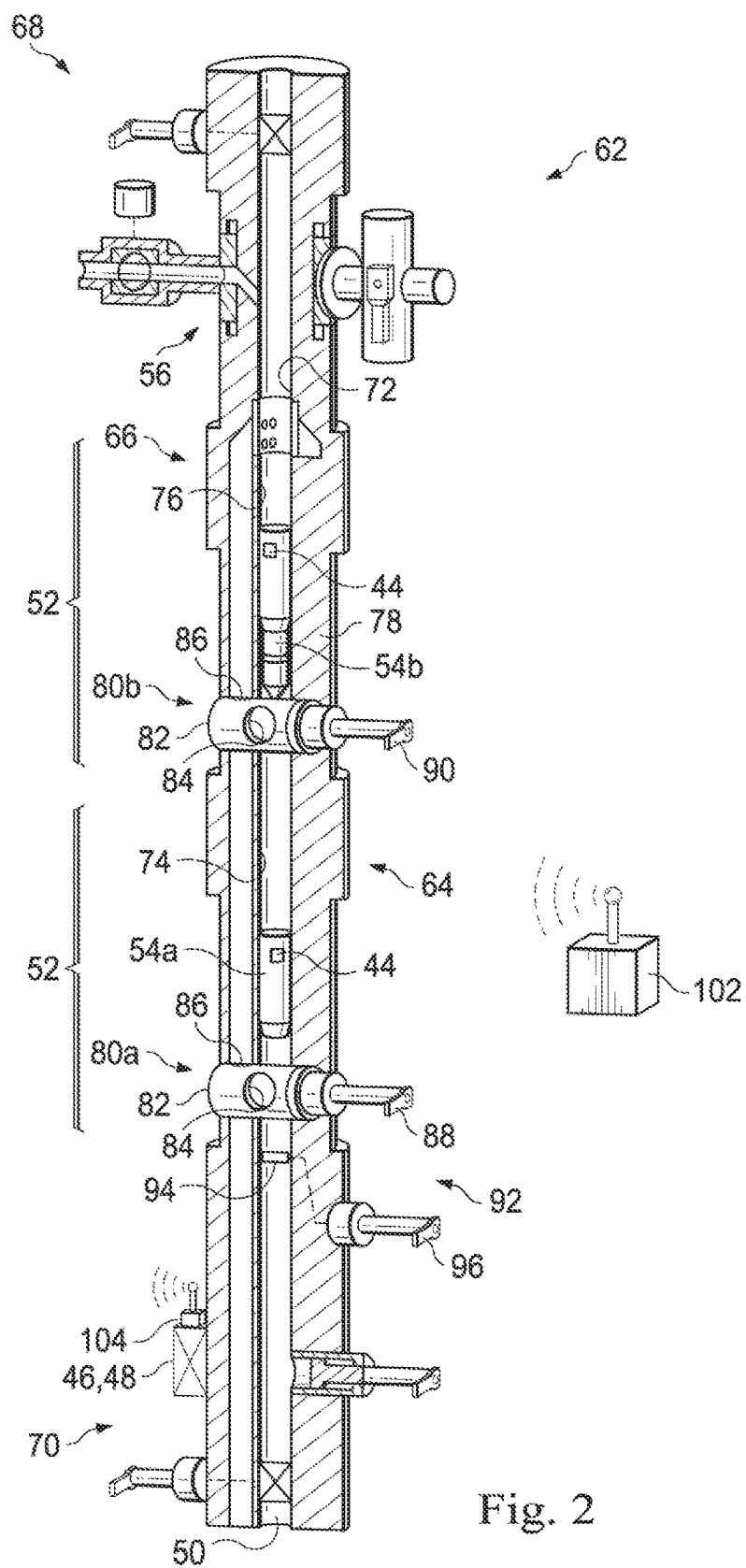
FIG. 2 is a plan view of a cement head assembly incorporating a releasable object tracking system of the disclosure.

One embodiment of surface mounted equipment 62 is illustrated in FIG. 2 as a cement head assembly 64 that incorporates an object release 52, but it is understood that cement head assembly 64 is provided for illustrative purposes of one embodiment only.

Thus, cement head assembly 64 generally includes a cement head sub 66 and, optionally, an upper safety valve system 68 and a lower safety valve system 70. Cement head sub 66 is an elongated tubular 78 having an inner bore 72 extending therethrough. Cement head sub 66 includes a lower or first object chamber 74 and an upper or second object chamber 76, each disposed for receipt of an object 54 for release into pipe system 50. One or both of chambers 74 and 76 may be comprised of a portion of inner bore 72 or may be separately formed and in communication with inner bore 72. An object release mechanism 80 is disposed in proximity to each of first chamber 74 and second chamber 76 to secures objects 54a, 54b in their respective chambers and which can be activated to release object 54 through inner bore 72.

In some embodiments, chambers 74 and 76 each comprise a portion of inner bore 72. Associated with lower object chamber 76 is a lower release mechanism 80a and associated with upper object chamber 74 is an upper release mechanism 80b. Each release mechanism 80 includes a release element 82 movable between a first position (closed) to secure an object 54 in an associated chamber 74, 76 and a second position (open) to release an object 54 from the associated chamber 74, 76. In some embodiments, movable release element 82 is a rotatable cylindrical element having a first radial through bore 84. In some embodiments, rotatable cylindrical element 82 may also include an internal flow passage 86. Rotatable element 82 is radially positioned at the lower end of each chamber 74, 76 and rotatable between a first closed position (shown) in which bore 84 is offset from bore 72, and a second release position (not shown) in which bore 84 is aligned with bore 72.

Release mechanism 80 preferably also includes a position indicator, such as is illustrated by lower indicator 88 and upper indicator 90. Each indicator 88, 90 provides an external visual indication of the alignment of bore 84 relative to bore 72.

Persons of ordinary skill in the art will appreciate that while object release 52 is illustrated with two chambers 74, 76, object release 52 may include fewer chambers or more chambers. For example, a third chamber with a corresponding release mechanism may be included.

Positioned along elongated tubular 78 below lower chamber 76 is a flipper mechanism 92. Flipper mechanism 92 generally includes an arm or extension 94 movably mounted on tubular 78 so that arm 94 protrudes into bore 72 when arm 94 is in a first position and is at least partially retracted from bore 72 when arm 94 is in a second position. Linked to arm 94 is a visual indicator 96 mounted on the exterior of tubular 78. Visual indicator 96 is movable between a first position corresponding to the first position of arm 94 and a second position corresponding to the second position of arm 94. As an object 54 moves past arm 94 in bore 72, the object 54 drives arm 94 from its first position to its second position. Visual indicator 96 thereby provides an indication that an object 54 has moved past arm 94 following release of object 54 from its corresponding chamber.

Positioned along elongated tubular 78 below lower chamber 76 are one or more second signal systems 46 disposed to communicate with a first signal system 44 carried by object 54. In one or more embodiments, one of the signal systems 46, 44 is a signal transmitter disposed to transmit or emit a signal that can be used to identify the object 54, while in other embodiments, one of the signal systems 46, 44 is a signal receiver disposed to receive a signal that can be used to identify the object 54.

In one or more embodiments, the above-the-wellhead second signal systems 48 is positioned below flipper mechanism 92 to ensure object 54 passes flipper mechanism 92 upon release. In any event, in one or more embodiments, first signal system 44 carried by the object 54 may be a signal transmitter in the form of an RFID chip and second signal system 46, such as above-the-wellhead second signal systems 48, may be a signal receiver in the form of an RFID reader which may be positioned to identify object 54 as it passes the RFID reader. In one or more embodiments, the first signal system 44 may be a signal transmitter in the form of a magnet attached to or carried within the object 54, and above-the-wellhead second signal systems 48 positioned along elongated tubular 78 may be a signal receiver in the form of an electromagnetic sensor. In one or more embodiments, the first signal system 44 is simply any device or material that emits measureable magnetic field or electromagnetic (EM) energy as a "signal" and the second signal system 46 is any device, such as a sensor, disposed to measure or otherwise identify the EM energy or "signal" emitted by first signal system 44. In this regard, object 54 may be formed of a material that emits a magnetic field or EM energy. In one or more embodiments, the first signal system 44 may transmit discreet signals unique to the particular object 54 with which the first signal system 44 is associated. Thus, in the case where multiple objects 54 might be used in an operation, the first signal system 44 of each object may transmit a signal different or separately identifiable from the signals of the first signal systems 44 of the other objects 54. For example, in the case of an operation utilizing two objects 54a, 54b, the first signal system 44 of the first object 54a will transmit a first signal and the first signal system 44 of the second object 54b will transmit a second signal different from the first signal. In one or more embodiments, the second signal system 46 is simply any device that emits measureable magnetic field or electromagnetic (EM) energy and the first signal system 44 is any device, such as a sensor, disposed to measure the EM energy emitted by the second signal system 46. As used herein, "signal system" may be a signal transmitter, a signal receiver, or both a signal transmitter and a signal receiver. Thus, the configuration of signal transmitters and signal receivers may be reversed, with signal receivers carried by an object and signal transmitters positioned along the wellbore. In any event, the disclosure is not limited by the manner in which signals are distinguished. Thus, signals may be different in frequency, phase or amplitude, among other methods for differentiating signals generally known in the art.

In one or more embodiments, second signal system(s) 46 may be hard wired to a monitoring system 102 remote from or positioned at a location removed from the proximity of the surface mounted equipment 62, while in other embodiments, one or more second signal systems 46 may include a wireless transmitter 104 forming a wireless network disposed to wirelessly communicate with monitoring system 102 or with other second signal systems 46. Without limiting the foregoing, monitoring system 102 may be a computer system, a control system, a handheld or portable device such as a tablet or smartphone, or some other type of monitoring or control equipment.

Figure 3:
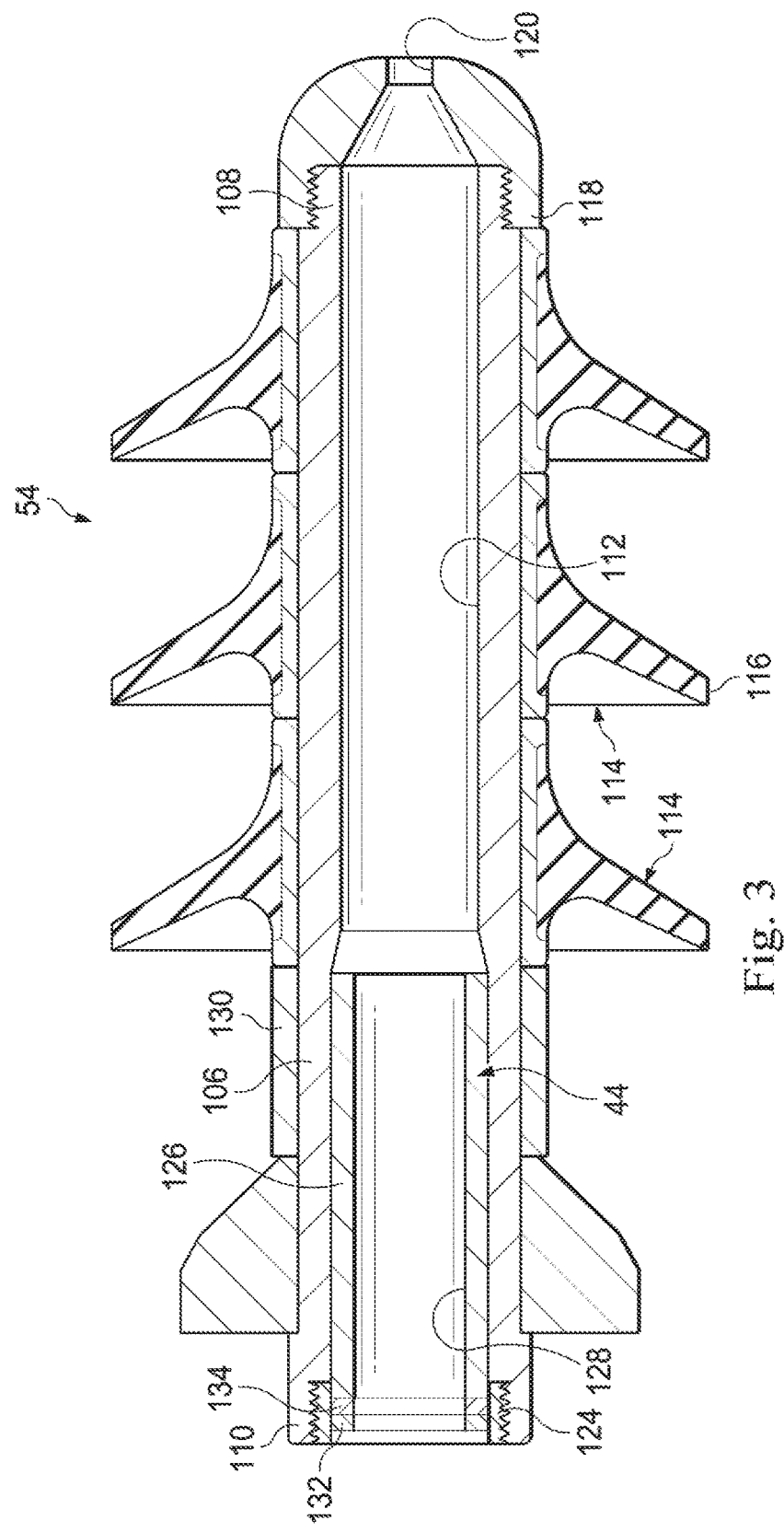
FIG. 3 is a plan view of a releasable object and signal transmission system of the disclosure.

Although object 54 is not limited to a particular type or configuration, FIG. 3 illustrates one embodiment of object 54. Object 54 of FIG. 3 illustrates first signal system 44 as a signal transmitter. As shown in FIG. 3, in one or more embodiments object 54 may include an elongated tubular body 106 having a first end 108 and a second end 110 with a bore 112 formed therein. In one or more embodiments, bore 112 may be a throughbore or passage or channel to allow fluid to pass through or by object 54. Disposed along the outer surface of object 54 are one or more wipers 114 having an outwardly extending flexible lip 116. Lip 116 may be formed of a pliable or resilient material, such a rubber. An end cap 118 is mounted on first end 108 and may include an aperture 120 in communication with bore 112. First signal system 44, or a portion thereof, may be mounted along or within bore 112. In one or more embodiments, first signal system 44 may include a throughbore 128 in fluid communication with bore 112 so that fluid entering object 54 through aperture 120 may pass through object 54. In any event, first signal system 44 may be secured to object 54 by a fastener 124, preferably adjacent the second end 110 of object 54 so that a second signal system 46 disposed in pipe system 50 (see FIG. 1) preferably will not will not receive a signal from the object 54 until the object 54 has substantially moved past the second signal system 46. In one or more embodiments, first signal system 44 may be a cylindrical shaft 126 formed of a magnetic material or EM emitting material. In the case were first signal system 44 is a cylindrical shaft 126, cylindrical shaft 126 may include throughbore 128. In one or more embodiments, fastener 124 may be an externally threaded ring disposed to engage internal threads disposed in bore 112 adjacent second end 110 of object 54. In one or more embodiments, the signal from first signal system 44 may be unidirectional or otherwise shielded, such as by shielding 130, so that the receiver 46 only receives a signal after a desired portion of object 54 has moved past second signal system 46. For example, a unidirectional signal transmitted behind or upstream of object 54 would only be detected by second signal system 46 once object 54 has moved past the location of second signal system 46. In another example, shielding 130 may be disposed to limit the direction of propagation of a signal emitted from first signal system 44. In one or more embodiments, control electronics 132 and a power source 134 may also be included as part of first signal system 44.

In operation, first signal system 44 carried by object 54 is activated, as necessary, prior to release from or through the surface mounted equipment 62. It will be understood that in some cases, such as where first signal system 44 is magnetic material carried by object 54 or otherwise forming object 54, no activation is necessary. In any event, once first signal system 44 is activated or otherwise emitting a signal, object 54 is released into pipe system 50. In one or more embodiments, object 54 may be released from an object release 52. In the illustrated embodiment, object 54 is released into the elongated tubular 78 of cement head sub 66. When object 54 passes the second signal system 46, a signal emitted from object 54 is received by second signal system 46, triggering a signal that is transmitted, either via a wired or wireless transmission system, to monitoring system 102, permitting verification that the object 54 has passed the location of the second signal system 46. To the extent second signal system 46 is above the wellhead 32 in the form of above-the-wellhead second signal system 48, communications between above-the-wellhead second signal system 48 and first signal system 44 occur by wired or wireless signal transmission. Above-the-wellhead second signal system 48 may be positioned adjacent object release 52 or along subsea conduit 36 or adjacent wellhead 32. In this way, operators can know with certainty that object(s) 54 has been released from or has otherwise passed through surface mounted equipment 62, such as plug containers, cementing subs, top drive heads or the like, thus allowing a particular procedure to continue or ensuring the object 54 has passed a particular above-the-wellhead location.

For example, in a cementing operation, a first plug, such as shown as 54a, in a lower chamber 74 is released into the wellbore 12. As object 54a passes second signal system 46, the signal from first signal system 44 is received by second signal system 46, and a signal is transmitted to monitoring system 102, notifying an operator that the operation can continue. Upon receipt of the signal triggered by passage of the first object 54a, a cementious slurry is released into the wellbore. Following the release of the cementious slurry, a second plug, such as shown as 54b, in an upper chamber 76 is released into the wellbore 12. As object 54b passes second signal system 46, the signal from first signal system 44 is received by second signal system 46, and a signal is transmitted to monitoring system 102, notifying an operator that the operation can continue. Upon receipt of the signal triggered by passage of the second object 54b, drilling or some other type of working fluid may be released into the wellbore to complete the operation. It will be appreciated that the operator is relying on the received trigger signal, indicating that the object has moved past the second signal system 46, before proceeding with a particular operation.

While the foregoing has been described with the first signal system 44 carried by the object 54 as a transmitter signal and the second signal system 46 positioned along the travel path of the object 54 as a signal receiver, it will be appreciated that the first signal system 44 carried by object 54 could be a signal receiver and that the second signal system 46 positioned along the travel path of the object 54 could be a signal transmitter, so long as the transmitter and receiver operate in conjunction to identify the passage of the object 54 past a known location along the travel path. Likewise, it will be appreciated that the travel path may be above the wellhead 32 to track movement of an object 54 through or past surface mounted equipment 62, pressure control devices 34, subsea conduit 36 or the like; through the wellhead 32; or below the wellhead 32 through or past a subsurface equipment 42 or a portion of pipe system 50 disposed within wellbore 12.

Figure 4:
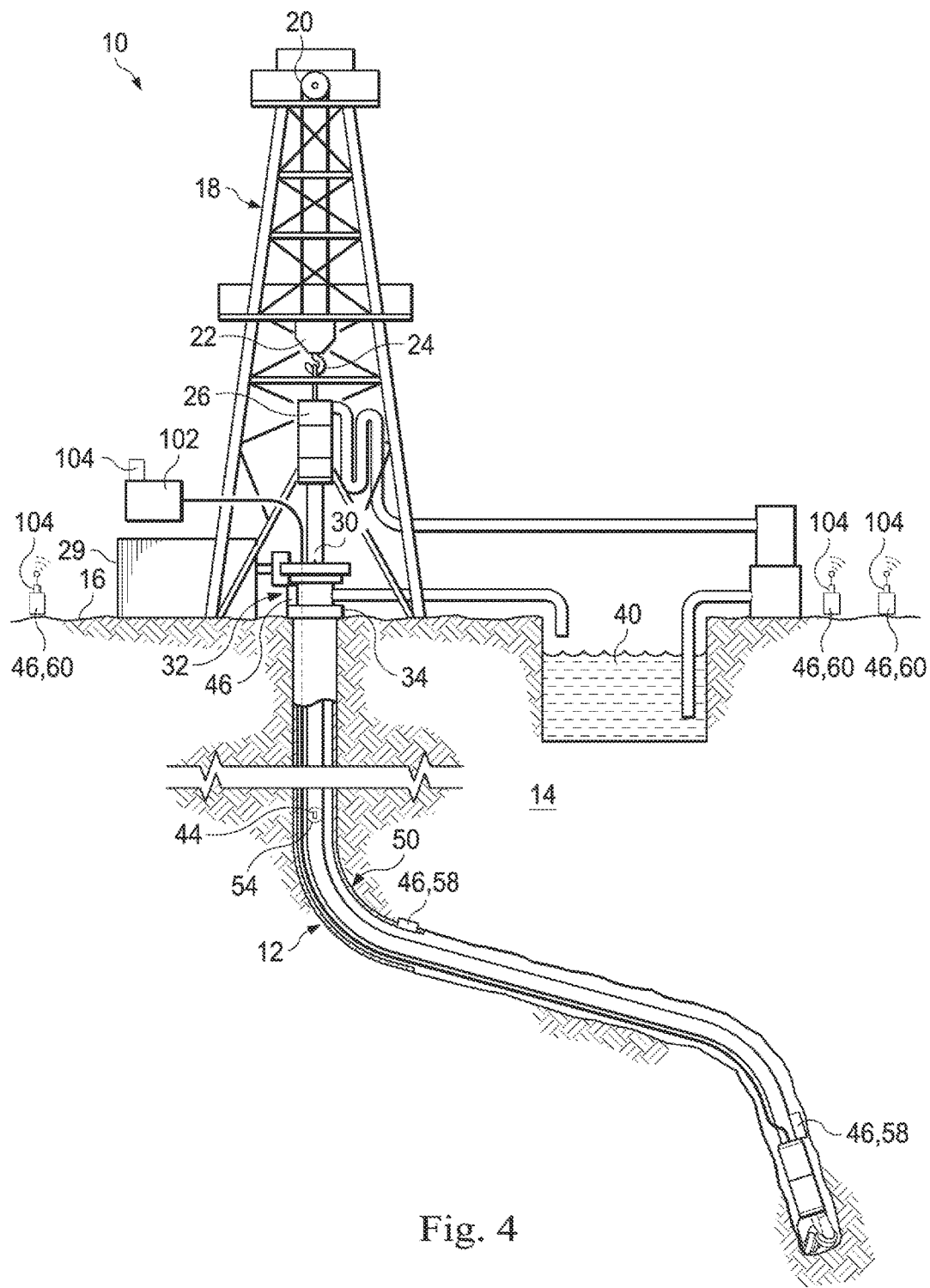
FIG. 4 is a plan view of a land based drilling system having a very low frequency system for tracking a releasable object in a wellbore.

Turning to FIG. 4, in one or more embodiments of an object tracking method and system for use with oil and gas wellbores 12, the first signal system 44 carried by object 54 is disposed to communicate with one or more second signal systems 46 via a through-the-earth transmitted signal, such as a very-low-frequency (VLF) electromagnetic radiation in the range of 3-30 kilohertz (kHz) as the signal. The through-the-earth or VLF signal can be used to track an object 54 as it passes through the wellhead 32 and into the portion of pipe system 50 within formation 14 via a VLF signal conveyed through formation 14, thereby allowing an operator to know if an object 54 has by through a location or sub-surface equipment or has reached a particular depth.

In embodiments utilizing a through-the-earth or VLF signal, one or more surface second signal systems 60 deployed adjacent surface 16 are disposed to communicate via a through-the-earth or VLF signal. In this regard, in some embodiments, at least two spaced apart through-the-earth or VLF second signal system 60 are deployed adjacent surface 16 so that a 2-dimensional position of object 54 can be determined by triangulation, trilateration or similar algorithms or techniques utilized to determine location. Likewise, through-the-earth or VLF second signal system 60 may be arranged on surface 16 in a one or two dimensional array so that a two dimensional or three dimensional position of object 54 can be determined by triangulation, trilateration or similar algorithms or techniques utilized to determine location. Such algorithms or techniques can be carried out, for example, by monitoring system 102, with data being transmitted to monitoring system 102 via a wireless communication path or a wired communication path, which for purposes of the disclosure may include traditional cable, Ethernet, fiber optics or any other physical transmission medium. VLF second signal systems 60 may likewise be in communication with each other via a wired or wireless communication path. In some embodiments, three or more spaced apart VLF second signal systems 60 are deployed adjacent surface 16 so that a three dimensional position of object 54 can be determined by triangulation, trilateration or a similar algorithms or techniques utilized to determine location. In some embodiments, the VLF second signal systems 60 may be spaced apart from each other at least 10 meters. The position of the object 54 can be overlaid or imposed upon the known location and orientation of the pipe system 50 to determine the position of the object 54 in pipe system 50. Alternatively, movement of object 54 can be used to map pipe system 50 as object 54 passes therethrough, thereby permitting the creation of an accurate two-dimensional or three-dimensional visualization of wellbore 12 in formation 14.

In one or more embodiments, the through-the-earth or VLF signal is transmitted at predetermined time intervals, such as every 1-3 seconds, and tracking can occur in real time. Moreover, the first signal system 44 is time-synchronized with the second signal system(s) 46 so that the signal travel time between the first signal system 44 and each second signal system 46 can be utilized in the algorithms and techniques referenced herein. In this regard, the second signal system(s) 46 may be time-synchronized with each other as well as with the monitoring system 102.

It will be appreciated that unlike other EM signals such as radio frequency (RF) signals that are generally in the frequency range of approximately 300 kilohertz (kHz) or higher, through-the-earth signals, which for purposes of this disclosure are below approximately 300 kHz and in particular VLF signals, which are most commonly in the range of 3-35 kHz, can penetrate materials such as rock, concrete, metal, and high density ore and propagate therethrough. Thus, the VLF signal systems as described herein may be referred to as through-the-earth signal systems or VLF signal systems to the extent a communications signal is being transmitted through the earth between a transmitter and a receiver.

The disclosure is not limited to a particular arrangement for the first signal system 44 and through-the-earth second signal system 60. While first signal system 44 may be either a transmitter or a receiver or both, and while through-the-earth or VLF second signal system 60 may be either a corresponding receiver or a transmitter or both, for purposes of the discussion of FIG. 4, first signal system 44 shall be described as a VLF or through-the-earth transmitter and through-the-earth or VLF second signal system 60 shall be described as a through-the-earth or VLF receiver.

Thus, through-the-earth or VLF signals will travel through the formation 14 from first signal system 44 to through-the-earth or VLF second signal system 60. As used herein, a VLF receiver is any receiver disposed to receive a through-the-earth or VLF signal propagating through a body such as the formation. Such a VLF receiver 60 may include, without limitation, a microphone, a geophone, a single or multi-axis accelerometer, an acoustic receiver, an optic receiver (such as optic cable) or the like. Preferably, the VLF receiver 60 is in direct or indirect physical contact with the formation so as to form a physical coupling through which a VLF signal may travel. As used herein, a VLF signal may include data or simply comprise a VLF pulse emitted from first signal system 44 acting as a VLF transmitter, thus forming a through-the-earth communication system. Although not limited to a particular configuration, in one or more embodiments, a through-the-earth signal transmitter may be a set of electrodes establishing a through-the-earth or VLF electric current or modulated electric carrier waves.

In other embodiments, alternatively, or in addition to through-the-earth or VLF second signal system 60, one or more second signal systems 46 may be deployed along the wellbore 12 as wellbore second signal systems 58 at known spaced apart locations. In one or more embodiments, these wellbore second signal systems 58 may be disposed to communicate by VLF signal, RF signal or both, thus permitting movement of object 54 to be tracked through pipe system 50.

In one or more embodiments, wellbore second signal systems 58 is disposed to communicate via through-the-earth or VLF signal transmissions. In one or more embodiments wellbore second signal systems 58 are coupled in direct physical contact with the formation at the wellbore sandface or may be deployed within the cement surrounding wellbore 12 in coupled indirect physical contact with the formation 14 so as to form a physical coupling through which a VLF signal may travel. Such wellbore second signal systems 58 may be utilized either to simply identify an object 54 as it passes a particular location, much like as described with respect to above-the-wellhead second signal systems 46, or in spaced apart orientation to determine a position or location of object 54 as described herein.

In one or more embodiments, one or more of the wellbore second signal systems 58 may be or include RF sonic or other non-VLF, VLF, EM or other types of receivers deployed along pipe system 50. In this regard, wellbore second signal systems 58 may include multiple types of signal receivers, such as both VLF receivers and another EM receiver, such or non-VLF or a different frequency VLF receivers. Thus a particular signal may travel as one type of signal along a first portion of a transmission path between the object and a receiver and then along a second portion of the transmission path as a second type of signal. For example, a control signal transmitted to the object may travel first as a VLF signal through the formation to a wellbore second signal system 58, where the signal is converted to a RF signal for line-of-sight or radio frequency transmission to the object 54 in the wellbore. The signal is converted from VLF or VLF frequency to RF or RF frequency, or vice versa, for transmission along the transmission path. In another example, a control signal transmitted to the object may travel first as a VLF signal through the formation to a wellbore second signal system 58, where the signal is converted to an acoustic signal that is transmitted back up the wellbore 12 via a fluid column.

Likewise, object 54 may include at least two transmitters, such as for example, at least one first transmitter 44a that may be a VLF transmitter and at least one second transmitter 44b that may be an RF transmitter. Persons of ordinary skill in the art will appreciate that first transmitter 44a and second transmitter 44b may be the same transmitter configured to transmit communication signals at different frequencies.

Figure 5:
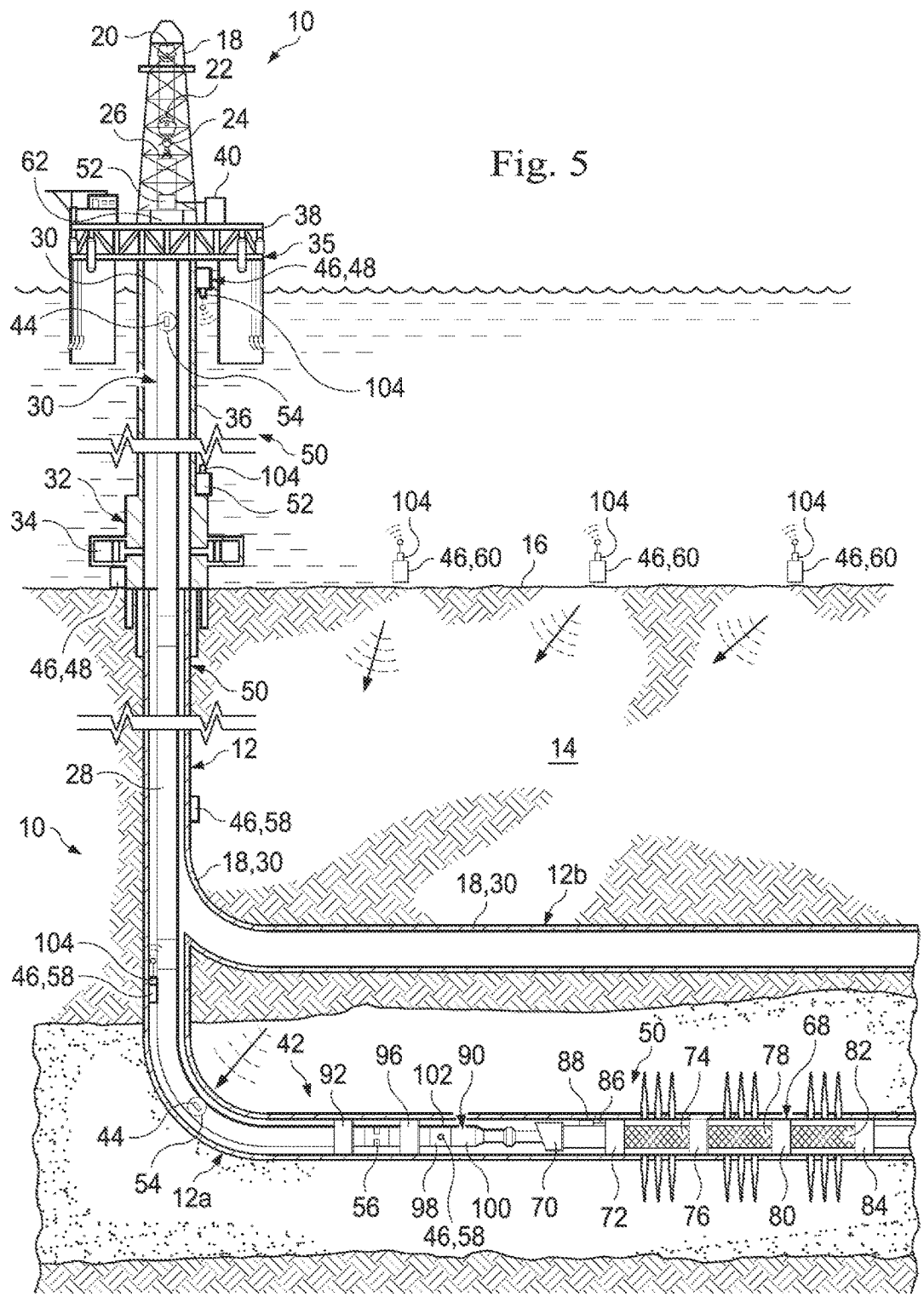
FIG. 5 is a plan view of a marine based drilling system having a very low frequency system for tracking a releasable object in a wellbore.

In one more embodiments, as illustrated in FIG. 5, each of surface VLF second signal systems 120 transmits a VLF signal into the formation 14. Object 54 receives the transmitted VLF signal from each surface VLF second signal systems 120 and then utilizes the received VLF signals from each of the surface VLF second signal systems 120 to determine location within wellbore 12. In this regard, location determination can be performed locally by object 54 or the received VLF signals can be communicated up wellbore 12 to monitoring system 164 where location determination techniques can be performed. In the case of the latter, information about the received VLF signals can be transmitted up the wellbore utilizing an RF signal generated from object 54 and transmitted up the wellbore 12 by one or more RF wellbore second signal systems 58 to monitoring system 102, where the signal data can be utilized to determine the location of object 54 relative to the surface VLF second signal systems 120. Thus, in these embodiments, the signal transmission path is down through the formation 14 and then up the wellbore 12 and the signal travels first as a VLF signal and then as an RF signal, while in the previous embodiments, the signal traveled as a VLF signal up from the object 54 through formation 12 either to surface VLF second signal systems 120 and/or wellbore second signal systems 58, or both.

To the extent wellbore second signal systems 58 are disposed to communicate an RF signal, wellbore second signal systems 58 may be spaced apart along the wellbore so that object 54 is in RF communication with at least one RF wellbore second signal system 58 regardless of the location of object 54 within pipe system 44. These RF wellbore second signal systems 58 may be in communication with each other in order to transmit the signal back up the wellbore 12 to monitoring system 102, or they may be in some other direct or indirect communications link with monitoring system 102, such as via a wire.

In one or more embodiments, one or more wellbore second signal system 58 include both a VLF transmitter 98 and a RF receiver 100. An RF transmitter 101 may be carried on object 54 and disposed to transmit an RF signal as the object 54 moves along wellbore 12. As the object 54 passes or otherwise is within a predetermined range of a particular RF receiver 100, the RF receiver triggers its associated VLF transmitter 98 to transmit a VLF signal through the earth to the VLF surface second signal systems 60 positioned on surface 16.

In one or more embodiments, a two-way communication link can be established between the surface second signal systems 60 and first signal system 44 on object 54, thus allowing remote activation of downhole equipment, such as tools, packers, valves, diverters and the like. Specifically, in some embodiments, a VLF signal transmitted from surface second signal systems 60 through formation 14 may be received by first signal system 44. Alternatively, the VLF signal may be received by wellbore second signal systems 58 and utilized to trigger the transmission of a control signal to object 54 or subsurface equipment 42. To the extent the signal is transmitted to object 54, object 54 can subsequently transmit an RF signal to another wellbore second signal system 58 deployed along pipe system 50 to activate subsurface equipment 42 or object 54 can communicate directly with the subsurface equipment 42, providing the control signal. In these embodiments, a portion of the activation or control signal is transmitted as a VLF signal through the earth and a portion of the activation or control signal is transmitted as a RF signal.

Figure 6:
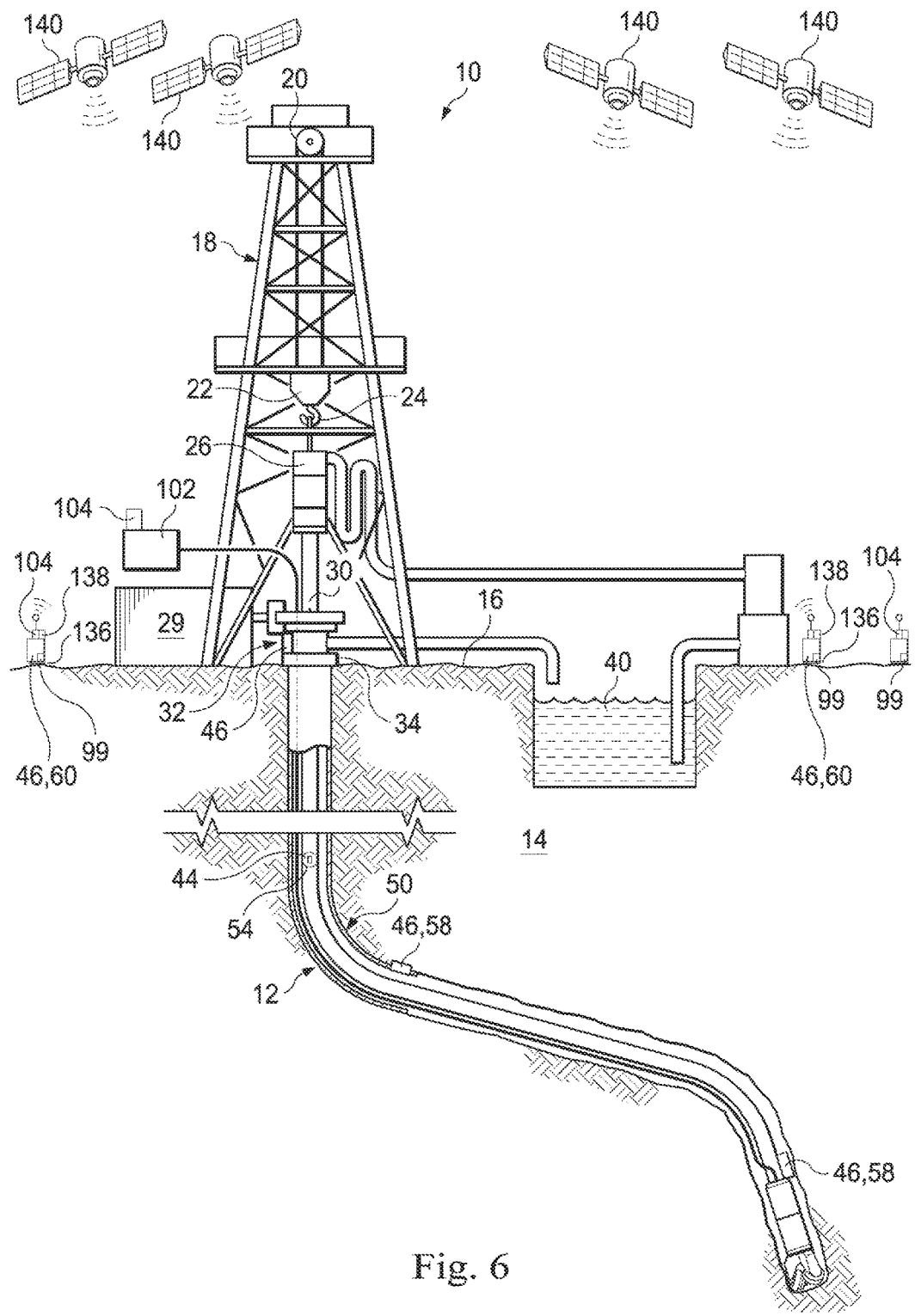
FIG. 6 is a plan view of a land based drilling system having a GPS system for tracking a releasable object in a wellbore.

FIG. 6 illustrates one or more embodiments of an object tracking method and system for use with wellbore drilling and production system 10 where at least two, and preferably three or more surface second signal systems 60 are deployed adjacent surface 16 at spaced apart positions or locations 136. The positions or locations 136 are known or determined utilizing a positioning or location system 138 to determine absolute positioning of second signal systems 60 and object 54 relative to one another. In one embodiment, four through-the-earth surface second signal systems 60 are deployed adjacent surface 16 at spaced apart positions or locations 136. Surface second signal systems 60 may be arranged on surface 16 in a one or two dimensional array. In one or more embodiments where at least 3 surface second signal systems 60 are used, the at least three receivers are spaced apart from one another so as to form a triangular grid or pattern on the surface 16. In one or more preferred embodiments, each through-the-earth second signal system 60 may include a VLF receiver 99 as described herein. In any event, such positioning system 138 may include one or more global positioning system (GPS) receivers, accelerometers (single or multi-axis), magnetometers, (single or multi-axis), theodolites, compasses, or, any kind of optical or physical system that can be used to measure the surface position or location 136 of each second signal system 60 on surface 16 and generate surface location data that can be associated with a through-the-earth tracking signal received from object 54 at each particular second signal system 60 second signal system 60. Positioning system 138 may operate utilizing one or more GPS satellites 140 such as is illustrated in FIG. 6. In one or more embodiments, four or more GPS satellites 140 are utilized. In one or more embodiments, the positioning system 138 is a GPS receiver 142 associated with each second signal system 60 second signal system 60 so as to form an overall "underground" GPS to track object 54 in wellbore 12. In other words, positioning system 138, such as a GPS system or other surface positioning device, is used to accurately determine the location 136 of the point on surface 16 where a particular through-the-earth or VLF signal is received. The absolute locations of multiple second signal system 60 and hence the location 136 where each through-the-earth signal is received or transmitted, combined with timing information related to the through-the-earth signals between the object 54 and each second signal system 60 can be used to determine the three-dimensional position of the object 54 within the formation 14. Although the disclosure is not limited to a particular technique, in one or more embodiments, such position may be determined by triangulation, trilateration or a similar algorithm or geometric techniques utilized to determine location. Such position determination can be carried out, for example, by monitoring system 102, with data being transmitted to monitoring system 102 via a wireless communication path or wired communication path, which for purposes of the disclosure may include traditional cable, Ethernet, fiber optics or any other physical transmission medium. Second signal systems 60 may likewise be in communication with each other via a wired or wireless communication path. In one or more embodiments, each second signal system 60 includes a dedicated positioning system 138, such as GPS receiver, which GPS receiver 138 may be integrated with second signal system 60. In such case, the GPS data can be updated during tracking operations, thereby enhancing underground tracking results. The system, and in particular, a combined second signal system 60 and positioning system 138 having a GPS receiver, function as amplifiers, in that the actual GPS signal is received at the surface and magnified for "underground" use.

In other embodiments, a positioning system 138 having a GPS receiver simply may be utilized to place each second signal system 60 at a predetermined location 136 or to identify the location 136 where a second signal system 60 is placed, thereby generating absolute positioning coordinates of each second signal system 60 that can subsequently be used in location determination of object 54. Whether a second signal system 60 has a dedicated positioning system 138 having a GPS receiver or a GPS receiver 138 is simply used in the placement of second signal system 60, for purposes of the disclosure, each second signal system 60 is said to have a GPS receiver 138 associated with it. In some embodiments, the positioning system 138 having a GPS receiver may be combined with a second signal system 60 to form an integral, standalone second signal system package 144 for deployment along surface 16, wherein a plurality of the packages 144 comprise the object tracking system. Moreover, the term "receiver" as used herein may include transmitters or transceivers, such as for example, the referenced GPS receiver 142 may receive and transmit signals with a GPS satellite as is well known in the industry.

Although any type of through-the-earth energy signal may be utilized in conjunction with location system 138, in one or more preferred embodiments, the through-the-earth signal may be a VLF signal as described above. In one or more embodiments, the through-the-earth energy signals may be acoustic or pressure energy. In one or more embodiments, the through-the-earth energy may be EM energy at other frequencies.

Figure 7:
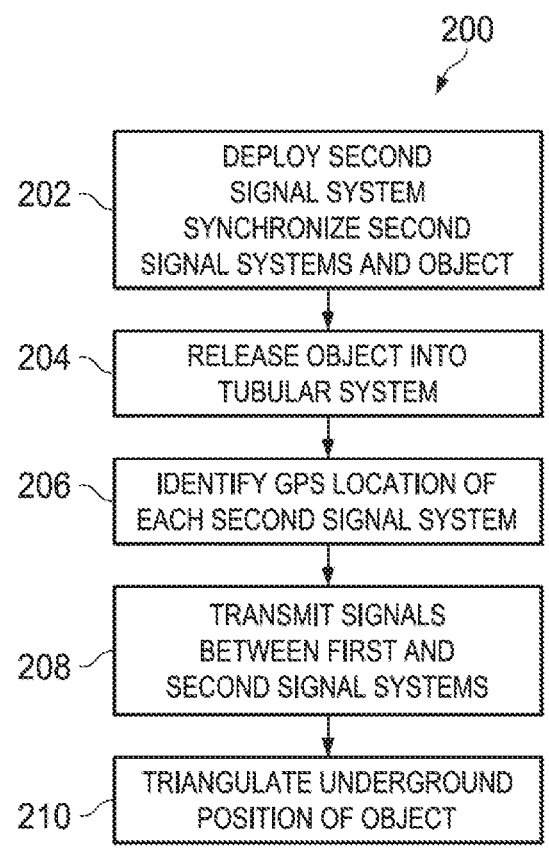
FIG. 7 is a flowchart of a method of utilizing a very low frequency signal to track a releasable object in a wellbore.

An operation 200 to identify the position of an object 54 in formation 14 is illustrated in FIG. 7. In a first step 202, multiple second signal systems 60 are deployed on the surface 16, preferably spaced apart from one another to form an array, above wellbore 12. The second signal systems 60 are time synchronized with each other and with the first signal system 44 carried by object 54, all of which may also be time synchronized with a monitoring system 164. In a second step 204, object 54 is released into wellbore 12. Prior to release, a first signal system 44 may be activated to communicate with one or more second signal system 46 via a through-the-earth or VLF signal, such as, for example, second surface signal systems 60 positioned on surface 16.

In step 206, the absolute or relative position of each second signal systems 60 is determined utilizing a GPS system or other location determination system. In one or more preferred embodiments, each second signal systems 60 includes a GPS receiver 12 and during a position determination operation, is in continuous or semi-continuous communication with a system of GPS satellites. Alternatively, the GPS receiver 12 of each second signal systems 60 may be intermittently activated to determine location. Time synchronization may occur via the GPS system. In any event, the relative positioning of each second signal system 60 is determined.

In step 208, the first signal system 44 and the second surface signal systems 60 communicate with one another via a through-the-earth signal transmitted therebetween. In one or more embodiments, the through-the-earth signal is emitted into the formation 14 by first signal system 44 carried by object 54. Each surface second signal system 60 receives the through-the-earth signal. In one or more other embodiments, each second surface signal system 60 may transmit a through-the-earth signal that is received by the first signal system 44. In either case, in one or more embodiments, each second surface signal system 60 connects to one or more GPS satellites 140 via a GPS receiver 142 associated with each second surface signal system 60.

In step 210, the signals received by the systems 60 are utilized to triangulate or otherwise determine the position of the object 54 in wellbore 12 utilizing the three-dimensional positioning (x,y,z) of each second surface signal system 60, the orientation (φ,ψ,θ) of the first signal system 44 and the distance (d) between the first signal system 44 and each second surface signal system 60. This determination may be carried out at a base station, such as monitoring system 164, that is directly or indirectly in communication with each second surface signal system 60 or the first signal system 44, or both.

Figure 8:
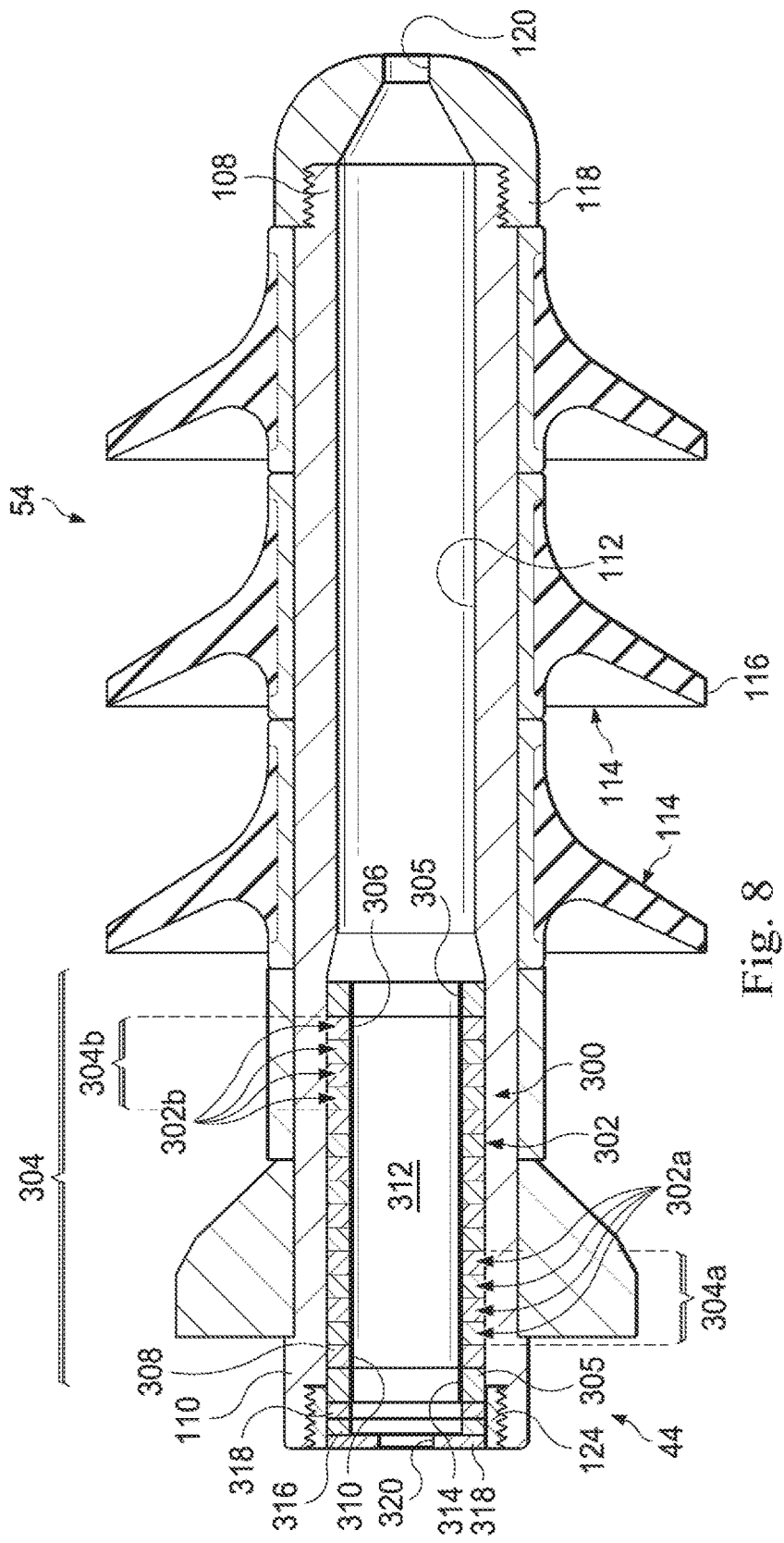
FIG. 8 is a plan view of a releasable object and piezoelectric signal system of the disclosure.

Turning to FIG. 8, in one or more embodiments, first signal system 44 carried by object 54 is a piezoelectric system 300 disposed to trigger a signal when pressure is applied to piezoelectric system 300. Piezoelectric system 300 includes one or more piezoelectric elements 302. In one or more embodiments, piezoelectric system 300 includes a plurality of piezoelectric elements 302 arranged to abut one another to form a stack 304. In any event, piezoelectric element 302 is mounted on object 54 so as to have at least one exterior surface 306 arranged so as to be exposed to pressure applied from fluid within a wellbore, as is explained below.

Although piezoelectric element 302 may be any shape without liming the disclosure, in some embodiments, element 302 may be a disk 308 with an aperture 310 formed through disk 308. As such, when a plurality of disks 308 are arranged to form a stack 304, the apertures 310 align to form a passage or through way 312 extending through the stack 304. Disk 308 may be square, round or have any other perimeter shape as desired. In the embodiments illustrated in FIG. 8, disk 308 is round in shape and aperture 310 is circular in shape, such that through way 312 is a bore extending through the stack 304. The stack 304 may be comprised of piezoelectric element 302 each with brass electrodes between each element (+ and −) to improve structural integrity. Alternatively, stack 304 may be a single piezoelectric element 302, with only a single brass electrode on each end.

In one or more embodiments, one or more first piezoelectric elements 302a may form a first stack 304a and one or more second piezoelectric elements 302b may form a second stack 304b. In such case, each stack 304a, 304b may be selected to respond to a different stimulus, i.e., a different threshold pressures.

In one or more embodiments, a protective coating 314 is applied to or over exterior surfaces 306. Protective coating 314 may be formed of any material that allows a pressure applied thereto to be passed to exterior surface 306. Although the disclosure is not limited to a particular protective coating, in one or more embodiments, protective coating 314 may be formed of parylene, silicon, an elastomer or similar material that will permit the transmission of force to the exterior surface 306 while protecting the piezoelectric elements 302 from the high temperature, corrosive environment characteristic of wellbores. It will be appreciated that parylene may be particularly desirable because it can be applied directly on the surface 306, conforms to the shape of surface 306, is effectively stress-free, is chemically and biologically inert and stable, and is resistant to solvents and corrosive chemicals, such as may be found in downhole environments.

Although neither object 54 nor piezoelectric system 300 carried by object 54 are limited to a particular type or configuration, FIG. 8 illustrates one embodiment of object 54 and piezoelectric system 300, wherein piezoelectric system 300 forms a cylindrical stack 304. Object 54 may include an elongated tubular body 106 having a first end 108 and a second end 110 with a bore 112 formed therein. In one or more embodiments, bore 112 may be a throughbore to allow fluid to pass through object 54.

Disposed along the outer surface of object 54 are one or more wipers 114 having an outwardly extending flexible lip 116. Lip 116 may be formed of a pliable or resilient material, such a rubber. An end cap 118 is mounted on first end 108 and may include an aperture 120 in communication with bore 112. Piezoelectric system 300 comprises first signal system 44 and is mounted within bore 112. Through bore 312 of stack 304 is in fluid communication with bore 112 so that fluid entering object 54 through aperture 120 may pass through object 54.

Piezoelectric system 300 may include electronics 316 to convert an electric charge generated by deformation of a piezoelectric element 302 or the stack 304 into a signal that can be transmitted to a second signal system 46. In one or more embodiments, electronics 316 may be disposed to generate and transmit an acoustic signal which can travel up wellbore 12 through a fluid column for receipt by a second signal system 46 in the form of a microphone. In this regard, electronics 316 may include a power source 318, such as a battery, to facilitate generation of a signal. Although the disclosure is not limited to a particular operation of piezoelectric system 300 and electronics 316, in one or more embodiments, piezoelectric system 300 and electronics 316 may be calibrated to respond once a minimum pressure value (reaction pressure) has been achieved along exterior surface 306. Likewise, due to the nature of piezoelectric element 302, the response signal will incrementally change with pressure. This is also desired as it will provide a better/more clear indication of when object 54 lands and experiences a "bump pressure."

One or both ends of stack 304 may be bounded by a ceramic spacer 305. The hardness of a ceramic spacer allows better energy transfer from the motion of the stack 304 to the fluid medium. In this regard, in some embodiments, stack 304 motion is designed to be axial so any radial component would not be significant.

In one or more embodiments, the signal transmitted by the piezoelectric system 300 may be an acoustic wave (0-20 kHz) to communicate data through the fluid column to surface in order to determine the landing location of object 54.

In any event, piezoelectric system 300 is secured to object 54 by a fastener 124, preferably adjacent the second end 110 of object 54 to facilitate transmission of a signal up wellbore 12. It will be appreciated that in the foregoing arrangement, exterior surface 306 is the surface of through bore 312 of stack 304 so that pressure may be applied to stack 304 by wellbore fluid passing through tubular body 106.

In one or more embodiments, fastener 124 may be an externally threaded ring disposed to engage internal threads disposed in bore 112 adjacent second end 110 of object 54. A protective cover 318 having an aperture 320 formed therein may be secured to tubular body 106 to inhibit larger debris from passing into through bore 312 as object 54 is pumped down into a wellbore 12. In one or more embodiments, protective cover 318 is formed of an elastomer or other pliant material.

In operation, object 54 is released into a wellbore 12. Although object 54 may travel by gravity, in one or more embodiments, it is carried by a servicing fluid pumped down wellbore 12. It will be appreciated that as object 54 is generally traveling down wellbore 12, the pressure across exterior surface 306 is approximately the pressure of the servicing fluid in the wellbore 12. In other words, the pressure at the first end 108 and second end 110 are approximately the same as the object travels uninhibited along a wellbore 12.

In any event, object 54 travels along wellbore 12 until object 54 lands on a seat or landing collar 56 (see FIG. 1), which is disposed for receipt of object 54. Upon landing on seat or collar 56, it will be appreciated that object 54 functions to decrease the cross-sectional flow path of the servicing fluid, hence increasing the pressure of the fluid column upstream of seat or collar 56. In this regard, the flow path may be directed primarily through a channel or passageway, such as throughbore 184 of object 54, along which the exterior surface 306 is positioned. The increased pressure of the fluid along the flow path results in an increase in the pressure applied to exterior surface 306 of piezoelectric system 300 as the fluid flows past object 54. In response to the increase in pressure on exterior surface 306, the piezoelectric elements 302 generate an electrical charge resulting from an applied mechanical force. In one or more embodiments where piezoelectric system 300 includes a stack 304 of circular piezoelectric elements 302 forming a through bore 312, once object 54 has landed on seat or collar 56, downward fluid flow is directed though through 312 such that through bore 312 functions as a constriction in the flow of the service fluid, and thus increasing the pressure of the fluid flowing along through bore 312. This increased pressure results in an outward radial force on exterior surface 306, thus resulting in the generation of a charge by piezoelectric elements 302.

The charge generated by the piezoelectric elements 302 can then be used by the piezoelectric system 300 to produce and transmit a signal to a second signal system 46, which second single system 46 may be adjacent the surface 16, or incorporated in a downhole tool or system 42, or otherwise deployed in the wellbore, such as wellbore second signal system 58. In particular, electronics 316 receive the generated electric charge and transmits a signal. The signal may be a an EM signal, an RF signal, a VLF signal, a through-through-the signal as described above, or any other type of signal. In one or more preferred embodiments, the signal may be an acoustic signal. In this regard, piezoelectric elements 302 may be utilized by piezoelectric system 300 to generate an acoustic signal for transmission up the wellbore 12 through the fluid column, such as by utilizing a power source 318 to drive piezoelectric elements 302 at a particular frequency. In this embodiment, the signal may be an acoustic signal that propagates up the fluid column in the wellbore and the second signal system 46 may be a microphone in communication with monitoring system 102.

It will further be appreciated that the piezoelectric system 300 is adjustable so that the piezoelectric system 300 will only generate a signal once a particular pressure threshold has been reached. This allows an operator to distinguish between a circumstance where the object may become lodged in the wellbore at a location other than the desired seat. Thus, for example, in an instance where the object lodges along the wellbore at a location other than the desired seat, a pressure increase may be experienced in the fluid column upstream of the object 54, but not a pressure increase to the degree that would trigger a signal from piezoelectric system 300. Alternatively, a pressure increase may occur that is above a threshold expected when the object 54 seats in the desired location. In such case, in some embodiments, a signal is generated by the piezoelectric system 300 when a lower threshold is reached, and another signal is generated if a second upper threshold is reached. For example, the lower threshold may signify to an operator that object 54 has lodged or seated somewhere along the wellbore 12, but an upper threshold may signify that the object 54 is not seated in the desired location, resulting in a larger pressure than would be expected if the service fluid were flowing past the object 54 as desired.

Thus, a system for tracking an object in surface mounted equipment of an oil and gas wellbore has been described. Embodiments of the foregoing system may generally include a releasable object, the releasable object including a first signal system; and a second signal system positioned in proximity to the surface mounted equipment and disposed to communicate with the first signal system. Likewise, a surface mounted system for an oil and gas wellbore has been described and may generally include a tubular member having a first end and a second end; an object release mechanism in communication with the first end of a tubular member; a releasable object releasably contained within the release mechanism, the releasable object including a transmitter; and a receiver positioned in proximity to the surface mounted equipment and disposed to receive a signal from the transmitter. Likewise, a system for tracking an object in an oil and gas wellbore within a formation has been described and may generally include a releasable object disposed in a wellbore extending from the surface of the formation, the releasable object including a first VLF signal system; and at least two second VLF signal systems coupled to the surface and disposed to communicate with the first signal system via a VLF signal. Relatedly, a releasable object for release into an oil and gas wellbore has been described and may generally include a body; and a VLF transmitter carried by the body. Similarly, a system for tracking an object in an oil and gas wellbore within a formation has been described and may generally include a releasable object disposed in a wellbore extending from the surface of the formation, the releasable object including a first through-the-earth signal system; at least three second through-the-earth signal systems coupled to the surface and disposed to communicate with the first signal system via a through-the-earth signal; and a positioning system associated with each second signal system. A system for tracking an object in an oil and gas wellbore within a formation may also generally include a releasable object disposed in a wellbore extending from the surface of the formation, the releasable object including a first signal system, wherein the first signal system comprises and RFID transmitter; at least three second signal systems coupled to the surface, wherein the second signal systems are through-the-earth signal systems; a plurality of third signal systems spaced apart from one another along a wellbore and coupled to the formation and disposed to communicate with the first signal system via a through-the-earth signal, each third signal system including an RFID reader; and a positioning system associated with each second signal system. A releasable object for release into an oil and gas wellbore may also generally include a body; and a piezoelectric system carried by the body. A system for performing an operation in a wellbore may generally include a body; a first signal system carried by the body, wherein the first signal system comprises a piezoelectric element; and a second signal system disposed to communicate with the first signal system.

For any of the foregoing embodiments, the system or object may include any one of the following elements, alone or in combination with each other: a first signal system comprises a transmitter and the second signal system comprises a receiver; a first signal system comprises a receiver and the second signal system comprises a transmitter; a receiver further comprises a wireless transmitter in wireless communication with a monitoring system; a releasable object is selected from the group consisting of plugs, balls, and darts; a transmitter is an RFID chip;

a transmitter comprises a magnetic material; a releasable object is a plug comprising: an elongated tubular body having a first end and a second end with a bore formed therein, wherein the transmitter is a cylindrical shaft formed of a signal emitting material and mounted in the bore; a wiper disposed along an outer surface of the plug, the wiper having an outwardly extending flexible lip; a piezoelectric system carried by a releasable object; a bore formed in the tubular body is a throughbore, and a cylindrical shaft forming a transmitter includes a throughbore in fluid communication with the throughbore of the tubular body; a plug further comprises an end cap mounted adjacent the first end of the elongated tubular body, the end cap including an aperture in fluid communication with the throughbore of the tubular body, wherein the cylindrical shaft is mounted adjacent the second end of the tubular body; the body of a releasable object is selected from the group consisting of a ball, a plug, or a dart; the body of a releasable object is a plug comprising: an elongated tubular body having a first end and a second end with a bore formed therein, wherein the transmitter is mounted in the bore; an RF transmitter carried by the body of a releasable object; the VLF transmitter comprises a piezoelectric element; a first signal system comprises a VLF transmitter and the second signal system comprises a VLF receiver; a first signal system comprises a VLF receiver and the second signal system comprises a VLF transmitter; a transmitter is disposed to transmit a VLF signal in the range of 3-35 kilohertz (kHz); two VLF receivers are spaced apart from one another on the surface; at least three VLF receivers spaced apart from one another on the surface; the VLF receiver is a microphone; a VLF receiver disposed along the wellbore and coupled to the formation; a plurality of spaced apart VLF receivers disposed along the wellbore and coupled to the formation; an RF receiver or RF transmitter in communication with at least one VLF receiver; a plurality of spaced apart RF receivers disposed along the wellbore, and wherein the releasable object further includes a RF transmitter; a transmitter is disposed to emit a unidirectional signal; shielding disposed to limit the direction of propagation of a signal from the transmitter; a transmitter comprises a material that emits an electromagnetic signal; a receiver is an RFID reader; a receiver is an electromagnetic sensor; a receiver is a sensor; an object release mechanism in communication with the first end of a tubular member, wherein a receiver is positioned along the tubular member between the first end and a second end of the tubular member; a surface mounted system is a cement head assembly ant the tubular member forms an elongated tubular therein, the cement head assembly further comprising an inner bore formed in the elongated tubular and extending therethrough, wherein the object release mechanism comprises a first object chamber and a second object chamber formed in a portion of the inner bore, a release mechanism disposed in proximity to each of first chamber and second chamber, each release mechanism including a release element movable between a first position to secure a releasable object in an associated chamber and a second position to release a releasable object from the associated chamber, wherein the receiver is positioned along the elongated tubular between the second object chamber and the second end of the tubular member; a receiver further comprises a wireless transmitter in wireless communication with a monitoring system; a transmitter is selected from the group consisting of an RFID chip, a magnetic material and a material that emits an electromagnetic signal, and wherein the receiver is selected from the group consisting of an RFID reader and sensor; a cement head assembly further comprises an upper safety valve system and a lower safety valve system; a movable release element of cement head assembly is a rotatable cylindrical element having a first radial through bore and rotatable between the first position in which release element bore is offset from elongated tubular inner bore and the second position in which the release element bore is substantially aligned with the elongated tubular inner bore; a release mechanism of cement head assembly further comprises a position indicator externally mounted along the elongated tubular; a flipper mechanism of cement head assembly is positioned along elongated tubular between the second chamber and the second end of the tubular member, said flipper mechanism comprising an extension movably mounted on elongated tubular so that the extension protrudes into the inner bore when the extension is in a first position and is at least partially retracted from the inner bore when the extension is in a second position, a visual indicator mounted on the exterior of the elongated tubular and lined to the extension; the positioning system is selected from the group consisting of GPS receivers, accelerometers (single or multi-axis), magnetometers, (single or multi-axis), theodolites, compasses and optical systems; the second signal systems are through-the-earth transmitters and the third signal systems are through-the-earth receivers; the second signal systems are through-the-earth receivers and the third signal systems are through-the-earth transmitters; the positioning system is a global positioning system (GPS) comprising a GPS receiver; the positioning system is selected from the group consisting of GPS receivers, accelerometers (single or multi-axis), magnetometers, (single or multi-axis), theodolites, compasses and optical systems; the first signal system is a transmitter and the second signal systems are receivers; the first signal system is a receiver and the second signal systems are transmitters; the second through-the-earth signal systems are spaced apart from one another so as to form a triangular grid; each second through-the-earth signal system further comprises a separate GPS receiver with each second through-the-earth signal system; the second through-the-earth signal systems are spaced apart from one another on the surface a distance of at least 10 meters; one of either the first or second through-the-earth signal system is disposed to transmit a VLF signal in the range of 3-30 kilohertz (kHz) and each of the other through-the-earth signal system is disposed to receive the VLF signal; a through-the-earth signal transmitter is a set of electrodes establishing the VLF electric current or modulated electric carrier waves; the through-the-earth receiver is selected from the group a microphone, a geophone, a single or multi-axis accelerometer, an acoustic receiver or an optic receiver; at least four of the second through-the-earth signal systems spaced apart from one another on the surface; a monitoring system disposed to receive data from each of the second through-the-earth signal systems; a wireless communication network between each of the second through-the-earth signal systems and a monitoring system; the releasable object is a plug comprising: an elongated tubular body having a first end and a second end with a bore formed therein, wherein the first through-the-earth signal system is a transmitter mounted in the bore; a portion of the through-the-earth signal systems is selected from the group consisting of a microphone, a geophone, a single or multi-axis accelerometer and an acoustic receiver; the piezoelectric system comprises a piezoelectric element; the piezoelectric system comprises a plurality of piezoelectric elements in abutting contact with one another to form a piezoelectric stack; the plurality of piezoelectric elements each comprises a disk with an aperture formed therein and the apertures form a throughbore extending through the stack; the piezoelectric stack defines an exterior surface, the piezoelectric system further comprising a coating disposed over the exterior surface; the coating is select from the group consisting of parylene, silicon, and an elastomer; the body further comprises a fluid flow passage formed therein, and at least a portion of the piezoelectric system is disposed along the flow passage; the body is a plug comprising an elongated tubular body having a first end and a second end with a bore formed therein, wherein the a piezoelectric system comprises a cylindrical stack of piezoelectric elements mounted in the bore; the bore formed in the tubular body is a throughbore, and the cylindrical stack includes a throughbore in fluid communication with the throughbore of the tubular body; the plug further comprises an end cap mounted adjacent the first end of the elongated tubular body, the end cap including an aperture in fluid communication with the throughbore of the tubular body, wherein the cylindrical stack is mounted adjacent the second end of the tubular body; the releasable object further comprises a protective cover with an aperture formed therein, the cover disposed adjacent the second end of the tubular body; the releasable object further comprises an EM transmitter; the piezoelectric system comprises a first set of piezoelectric elements and a second set of piezoelectric elements carried by the body, wherein the first set of piezoelectric elements is disposed to generate a first signal in response to a first pressure and the second set of piezoelectric elements is disposed to generate a second signal in response to a second pressure different from the first pressure; the first signal system comprises a plurality of piezoelectric elements and the second signal system is a microphone; the first signal system further comprises control electronics electrically attached to the piezoelectric element and a power source; the body further comprises a fluid flow passage formed therein, and at least a portion of the piezoelectric element is disposed along the flow passage.

Thus, a method for tracking an object released adjacent surface mounted equipment of an oil and gas wellbore has been described and may generally include positioning a receiver between the surface mounted equipment and the wellhead of a wellbore; transmitting a signal from a releasable object; releasing the object to pass through at least a portion of the surface mounted equipment; and utilizing the receiver to verify that the releasable object has passed through at least a portion of surface mounted equipment. A method for tracking the position an object released into a wellbore has been described and may generally include positioning a first VLF signal system along the surface of a formation in which the wellbore is formed; releasing a releasable object into a wellbore; transmitting a VLF signal through the earth between the releasable object and the first VLF signal system; and determining the position of the object in the wellbore based on the transmitted VLF signal. A method for tracking the position an object released into a wellbore also may generally include releasing a releasable object into the wellbore; and determining the position of the object in the wellbore utilizing a global positioning system. A method for performing an operation in a wellbore has been described and may generally include releasing an object into a wellbore; pumping a service fluid in the wellbore to urge the object along the wellbore; utilizing a piezoelectric element carried by the object to generate a signal when the object engages a seat.

For the foregoing embodiments, the method may include any one of the following steps, alone or in combination with each other: verifying comprises transmitting an RFID signal from the releasable object and identifying the RFID signal as the releasable object passes in proximity to the receiver; verifying comprises transmitting a magnetic signal from the releasable object and identifying the magnetic signal as the releasable object passes in proximity to the receiver; transmitting a signal comprises activating a transmitter carried by the releasable object; transmitting a signal to a control system removed from the surface mounted equipment; releasing at least two objects to pass through at least a portion of the surface mounted equipment; and utilizing the receiver to verify that each released object has passed through at least a portion of surface mounted equipment, wherein each released object emits a different signal; operating an object release system to release a first plug from a cement head assembly into a wellbore; verifying that the first plug has passed in proximity to the receiver; wirelessly transmitting a first signal to a monitoring system; upon receipt of the wirelessly transmitted first signal, releasing a cementious material into the wellbore behind the first plug and thereafter, operating an object release system to release a second plug from the cement head assembly into the wellbore; verifying that the second plug has passed in proximity to the receiver; wirelessly transmitting a second signal to a monitoring system; and upon receipt of the wirelessly transmitted second signal, releasing a working fluid into the wellbore behind the second plug; transmitting a first signal by the first plug and transmitting a second signal by the second plug that is different than the first signal; positioning at least two first VLF signal systems along the surface of a formation, the first VLF signal systems being spaced apart from one another on the surface; transmitting a VLF signal through the earth between the releasable object and each first VLF signal system; and utilizing triangulation among the first VLF signal systems and the object to determining the position of the object in the wellbore; positioning three or more first VLF signal systems along the surface of a formation and utilizing VLF signals transmitted between each first VLF signal system and the object to determine the position of the object in the wellbore by triangulation; measuring the travel time of the transmitted VLF signal between each first VLF signal system and the object; measuring the distance between each first VLF signal system; and utilizing the measured travel times and distances to determine the position of the object in the wellbore; spacing the first VLF signal systems apart at least 10 meters from one another along the surface; determining the location of the object relative to the first VLF signal systems and overlying a three dimensional grid of the wellbore with the determined position of the object relative to the first VLF signal system; transmitting the VLF signal through the formation from the object to the first VLF signal system; transmitting the VLF signal through the formation from first VLF signal system to the object; generating a VLF signal in the range of 3-30 kilohertz (kHz); transmitting the VLF signal at predetermined time intervals; coupling the first VLF signal system in physical contact with the formation so as to form a physical coupling through which a VLF signal may travel; deploying along the wellbore in a known location at least one first VLF signal system; and utilizing the first VLF signal system deployed in the wellbore to track movement of the object along the wellbore; coupling the first wellbore VLF signal system in physical contact with the formation so as to form a physical coupling through which a VLF signal may travel; mounting a first wellbore VLF signal system receiver in casing cement; mounting a first wellbore VLF signal system in contact with the wellbore sandface; coupling one or more first VLF signal systems to one or more RF receivers and transmitting a signal between the surface and the object first as a VLF signal and then as and RF signal; electrically coupling one or more first VLF signal systems to one or more RF receivers and transmitting a signal between the surface and the object first as a RF signal and then as and VLF signal; utilizing a global positioning system in determining the position of the object in the wellbore; utilizing a global positioning system in determining the position of the first VLF signal system; utilizing a through-the-earth transmission signal to communicate between at least three through-the-earth signal systems disposed adjacent the surface of a formation and the object;

transmitting a through-the-earth signal from the object to each of the surface signal systems and utilizing the signal received by each surface signal system in determining the position of the object in the wellbore; transmitting a through-the-earth signal from each of the surface signal systems to the object and utilizing each of the signals received by the object in determining the position of the object in the wellbore; utilizing the global positioning system to ascertain the location of the receivers on the surface; generating positional GPS data for each of the receivers on the surface and transmitting the GPS data to a control system; time synchronizing a through-the-earth signal using the global positioning system; the generated signal is an electrical charge generated by the piezoelectric element; the generated signal is from a deformation of the piezoelectric element; directing a fluid flow through a passage in the releasable object to increase the pressure of the fluid and utilizing the increased pressure applied to the piezoelectric element to generate an electrical charge; transmitting an acoustic signal through a fluid column in response to the generated signal; transmitting a signal from the object in response to the generated signal; the transmitted signal is selected from the group consisting of an EM signal, an RF signal, a VLF signal, a through-the-earth signal or an acoustic signal; the transmitted signal is generated utilizing the piezoelectric element; and a first signal is transmitted upon application of a first pressure to a piezoelectric element and a second signal upon application of a second pressure to a piezoelectric element.

While the foregoing disclosure is directed to the specific embodiments of the disclosure, various modifications will be apparent to those skilled in the art. It is intended that all variations within the scope and spirit of the appended claims be embraced by the foregoing disclosure.

What is claimed:

1. A system for tracking an object in an oil and gas wellbore within a formation, the system comprising:
   a piping system disposed within the wellbore;
   a releasable object disposed in the piping system, wherein the releasable object includes a first through-the-earth signal system and is configured to sealingly engage an inner wall of the piping system;
   at least three second through-the-earth signal systems coupled to the formation via direct physical contact with the formation and disposed to communicate with the first signal system via a through-the-earth signal; and
   a positioning system associated with each second signal system.

2. The system of claim 1, wherein the positioning system is a global positioning system (GPS) comprising a GPS receiver.

3. The system of claim 2, wherein each second through-the-earth signal system further comprises a separate GPS receiver.

4. The system of claim 1, wherein the first signal system is a transmitter and the second signal systems are receivers.

5. The system of claim 1, wherein the first signal system is a receiver and the second signal systems are transmitters.

6. The system of claim 5, wherein a through-the-earth signal transmitter is a set of electrodes establishing the VLF electric current or modulated electric carrier waves.

7. The system of claim 1, wherein the second through-the-earth signal systems are spaced apart from one another so as to form a triangular grid.

8. The system of claim 1, wherein one of either the first or second through-the-earth signal system is disposed to transmit a very low frequency (VLF) signal in the range of 3-30 kilohertz (kHz) and each of the other through-the-earth signal system is disposed to receive the VLF signal.

9. The system of claim 1, wherein the releasable object is selected from the group consisting of plugs, balls, and darts.

10. The system of claim 1, wherein each of the second through-the-earth signal systems is a receiver in wireless communication with the monitoring system.

11. The system of claim 1, wherein the releasable object is a plug comprising: an elongated tubular body having a first end and a second end with a bore formed therein, wherein the first through-the-earth signal system is a transmitter mounted in the bore.

12. The system of claim 1, wherein a portion of the through-the-earth signal systems is selected from the group consisting of a microphone, a geophone, a single or multi-axis accelerometer and an acoustic receiver.

13. A system for tracking an object in an oil and gas wellbore within a formation, the system comprising:
   a piping system disposed within the wellbore;
   a releasable object disposed in the piping system, wherein the releasable object includes a first signal system and is configured to sealingly engage an inner wall of the piping system, and wherein the first signal system comprises a Radio Frequency ID (RFID) transmitter;
   at least three second signal systems coupled to the formation via direct physical contact with the formation, wherein the second signal systems are through-the-earth signal systems;
   a plurality of third signal systems spaced apart from one another along the wellbore and coupled to the formation via direct physical contact with the formation and disposed to communicate with the first signal system via a through-the-earth signal, each third signal system including an RFID reader; and
   a positioning system associated with each second signal system.

14. The system of claim 13, wherein the positioning system is a global positioning system (GPS) comprising a GPS receiver.

15. The system of claim 13, wherein the second signal systems are through-the-earth transmitters and the third signal systems are through-the-earth receivers.

16. The system of claim 13, wherein the second signal systems are through-the-earth receivers and the third signal systems are through-the-earth transmitters.

17. A method for tracking the position an object released into a wellbore, the method comprising:
   releasing a releasable object into a piping system disposed in the wellbore, wherein the wellbore is disposed within a formation and the releasable object is configured to sealingly engage an inner wall of the piping system; and
   transmitting a through-the-earth signal from the releasable object to each of at least one surface signal systems in a plurality of surface signal systems coupled to the formation via direct physical contact with the formation; and
   utilizing the signal received by each surface signal system and at least one global positioning system to determine a position of the releasable object in the wellbore.

18. The method of claim 17, further comprising transmitting a through-the-earth signal from the object to each of the surface signal systems in the plurality of surface signal systems and utilizing the signal received by each surface signal system in the plurality of surface signal systems in determining the position of the object in the wellbore.

19. The method of claim 17, further comprising generating positional GPS data for each of the surface signal systems in the plurality of surface signal systems and transmitting the GPS data to a control system.

20. The method of claim 17, further comprising time synchronizing a through-the-earth signal using the global positioning system.

* * * * *